United States Patent [19]

Aratani et al.

[11] Patent Number: 5,701,135
[45] Date of Patent: Dec. 23, 1997

[54] DISPLAY CONTROL METHOD AND APPARATUS

[75] Inventors: Shuntaro Aratani; Masamichi Ohshima; Kazumi Suga, all of Tokyo, Japan

[73] Assignee: Canon Kabushiki Kaisha, Tokyo, Japan

[21] Appl. No.: 246,724

[22] Filed: May 20, 1994

[30] Foreign Application Priority Data

May 25, 1993 [JP] Japan .................. 5-122501
May 25, 1993 [JP] Japan .................. 5-122502

[51] Int. Cl.$^6$ .................................. H04N 1/00
[52] U.S. Cl. .................................. 345/89; 345/97
[58] Field of Search .................................. 345/100, 103, 345/138, 136, 137, 185, 89, 97; 382/54; 348/446, 671; 358/445, 447, 456

[56] References Cited

U.S. PATENT DOCUMENTS

| | | | |
|---|---|---|---|
| 5,091,723 | 2/1992 | Kanno et al. | 340/784 |
| 5,309,254 | 5/1994 | Kawabara et al. | 358/456 |
| 5,345,250 | 9/1994 | Inoue et al. | 345/100 |

FOREIGN PATENT DOCUMENTS

| | | |
|---|---|---|
| 295105 | 12/1988 | European Pat. Off. |
| 395404 | 10/1990 | European Pat. Off. |
| 537428 | 4/1993 | European Pat. Off. |
| 570906 | 11/1993 | European Pat. Off. |
| 591683 | 4/1994 | European Pat. Off. |
| 592801 | 4/1994 | European Pat. Off. |

*Primary Examiner*—Mark R. Powell
*Attorney, Agent, or Firm*—Fitzpatrick, Cella, Harper & Scinto

[57] ABSTRACT

A display using interlaced scanning or a display using a partial rewriting method, in which only a part of a picture frame of a display device is rewritten and displayed, is combined with an error diffusion method resulting in an image displayed on the display device being made to be continuous. More specifically, when processing data of the first line of one band (comprising a plurality of lines) by the error diffusion method, error data produced when the final line of the immediately preceding band has been processed is stored in a memory, and error data stored in the memory is used. When processing data of the first line of a band by the error diffusion method, processing is started from data of a line a few lines above the first line.

23 Claims, 22 Drawing Sheets

UPPER LEFT END

UPPER LEFT END

UPPER
LEFT
END
```
00000000000000000000
00000000000000000000
00000100000100000100
00100000100000100000
00000000000000000000
00000100001000001000
00100000100001000000
00000000000000000010
00000100000000010000
00100000100100000000
00000000000000100000
00000100000000000100
00100000100100000000
00000000000000100000
00000100000000000100
00100000100100000000
00000000000000100000
00000100000000000100
00100000100100000000
00000000000000100000
```

DISPLAY CONTROL METHOD AND APPARATUS

BACKGROUND OF THE INVENTION

1. Field of the Invention

This invention relates to a display control method and apparatus, and more particularly, to a display control method and apparatus in which input data are quantized into binary or multi-value data, and the resultant data are transmitted to a display device.

2. Description of the Related Art

CRT displays have been generally used as computer displays. Since a CRT display requires a certain amount of distance (depth) in the direction of the thickness of the display device, it is difficult to reduce the size of the entire display device. In order to solve such a problem, liquid-crystal displays (hereinafter termed LCD's) have been developed.

LCD's are widely used because of their features of easiness to observe, low power consumption, and the like.

LCD's are classified into several types, but can be grossly classified into an active-matrix type and a simple-matrix type. In the active-matrix type, a type in which a TFT (thin-film transistor) is provided for each pixel (picture element) is frequently used. This type can perform full-color display because analog gradation can be displayed, but has the problems of high cost, and difficulty in providing a large picture surface.

Among various kinds of liquid crystals, ferroelectric liquid crystals (hereinafter termed FLC's) have a feature of "memory capability" in contrast to other kinds of liquid crystals. This feature indicates that a liquid crystal can maintain a display state caused by the application of a voltage. In a display device using an FLC, the constrast of the displayed image is not degraded irrespective of the number of scanning lines for display because of its memory capability. Hence, very fine display using a large picture surface can be performed even in a simple-matrix structure.

Although FLC'a have the above-described features, a device made of an FLC is basically a binary (having two gray-scale values) device, and therefore cannot perform halftone representation within one pixel. Accordingly, in order to display an image including a large amount of halftone portions, such as a photograph, it is necessary to perform image processing represented by an error diffusion method.

The error diffusion method is a method in which an error between a color intended to be displayed and an actually displayed color is diffused in the right and downward directions of a target pixel to macroscopically realize halftone display.

However, if the error diffusion method is used for displaying an image including halftone, representation of halftone is inferior at a portion where the processing of the method starts, as illustrated in FIG. 15.

FIG. 15 is an enlarged view of a part of the result of processing when image processing is sequentially performed from the uppermost line to lower lines from the left to the right. In such processing, halftone representation is inferior in regions of a few lines from the upper end in the vertical direction, and a few pixels from the left end in the horizontal direction, so that display close to so-called "solid" display is obtained. This is because diffused errors are insufficient in these regions.

FIG. 18 illustrates a result of processing expressed in numerical values 0 and 1 (0 corresponds to black, and 1 corresponds to white) when a conventional error diffusion method is executed. It is assumed that, for example, the same halftone data [30] (dark gray (0=black, and 255= white)) are stored in a video memory, and the error diffusion processing starts from the left end of the first line to the right, and is performed from the left to the right also for each line after the second line.

As is apparent from FIG. 18, in the conventional error diffusion processing, entire portions where the processing starts, i.e., the entire regions of a few lines (two lines in the case of FIG. 18) from the upper end and a few bits (two bits in the case of FIG. 16) from the left end assume 0 (black). Hence, desired dark gray display cannot be obtained in these regions.

Furthermore, when the conventional error diffusion processing is performed, halftone representation is inferior at portions indicated by thick lines in FIG. 17. For example, in a display device in which processing is started from a mid-portion of the picture surface, the above-described regions having inferior halftone may clearly appear even in a central portion of the displayed image, thereby greatly degrading the quality of the entire image.

The case, in which processing is started from a mid-portion of the displayed image in a display device, will arise when a portion where the contents of display differ from the contents of display in the preceding picture frame is processed. Such a case will be described in detail in the following embodiments.

In the case of a display device having a low frame-driving frequency, such as an FLC display device, high-degree interlaced scanning (multi-interlaced scanning) must be performed (see FIG. 23). Hence, image data processed by the ED (error diffusion) method, in which connection in the vertical direction is required, cannot be displayed.

SUMMARY OF THE INVENTION

It is an object of the present invention to solve the above-described problems.

It is another object of the present invention to provided a display control method and apparatus, in which the quality of an image processed by the error diffusion method can be improved.

It is still another object of the present invention to provide a display control method and apparatus, in which when dividing one picture frame into a plurality of regions, processing the divided regions by the error diffusion method, and displaying the resultant image, continuity can be provided in connection between the regions.

It is yet another object of the present invention to provide a display control method and apparatus, in which a disadvantage of the error diffusion method, i.e., degradation of the quality of an image represented in halftone at portions where processing starts, is overcome, so that a high-quality image can be displayed.

It is yet a further object of the present invention to provide a novel display control method and apparatus, in which interlaced scanning or partially writing scanning in a display device is combined with image processing by the error diffusion method.

According to one aspect, the present invention which achieves these objectives relates to a display control apparatus comprising data storage means for storing input image data, division means for dividing the image data stored in the data storage means into a plurality of bands in each having a predetermined number of lines, scanning means for performing non-interlaced scanning within each of the divided bands and for performing interlaced scanning in image processing means for performing image processing of the image data in units of a band, and transfer means for transferring data processed by the image processing means to a display device.

According to another aspect, the present invention relates to a display control apparatus comprising data storage means for storing input image data, division means for dividing the image data stored in the storage means into a plurality of bands each having a predetermined number of lines, image processing means for performing image processing of the image data in units of a band by an error diffusion method, and transfer means for transferring data processed by the image processing means to a display device. In one embodiment, when processing the first line of a band, the image processing means processes image data using error data produced from the preceding band. In another embodiment, when performing the image processing by the error diffusion method for each band, the image processing means starts the image processing from a line that is a predetermined number of lines above the first line of the band, and outputs data after the image processing from the first line of the band.

According to still another aspect, the present invention relates to an image processing apparatus for performing halftone processing of image data including halftone by performing error diffusion processing while sequentially reading each line constituting the image data. The apparatus comprises means for specifying a line below the first line constituting the image data, means for starting the error diffusion processing from the specified line toward the first line and for performing the error diffusion processing for lines after the second line by reversing the direction of the processing when the processing has reached the first line, and output means for outputting a result of the error diffusion processing from the first line after the direction of the processing has been reversed.

According to yet another aspect, the present invention relates to an image processing apparatus for performing halftone processing of image data including halftone by performing error diffusion processing while sequentially reading each line constituting the image data. The apparatus comprises processing means for performing error diffusion processing for image data of the first line a plurality of times, and output means for outputting a final result of the processing of the first line of image data.

According to yet a further aspect, the present invention relates to a display control method comprising the steps of inputting image data, dividing the input image data into a plurality of bands each having a predetermined number of lines, performing non-interlaced scanning within each of the divided bands and performing interlaced scanning between bands, in performing image processing of the image data in units of a band, and transferring data processed in the image processing step to a display device.

According to still a further aspect, the present invention relates to a display control method comprising the steps of inputting image data, dividing the input image data into a plurality of bands each having a predetermined number of lines, performing image processing of the image data in units of a band by an error diffusion method, and transferring data processed in the image processing step to a display device. In one embodiment, when processing the first line of a band, the image processing step processes image data using error data produced in the preceding band. In another embodiment, when performing the image processing by the error diffusion method for each band, the image processing step performs the image processing from a line that is a predetermined number of lines above the first line of the band, and outputs data after the image processing from the first line of the band.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

Preferred embodiments of the present invention will now be described in detail with reference to the drawings.

First Embodiment

Figure 1:
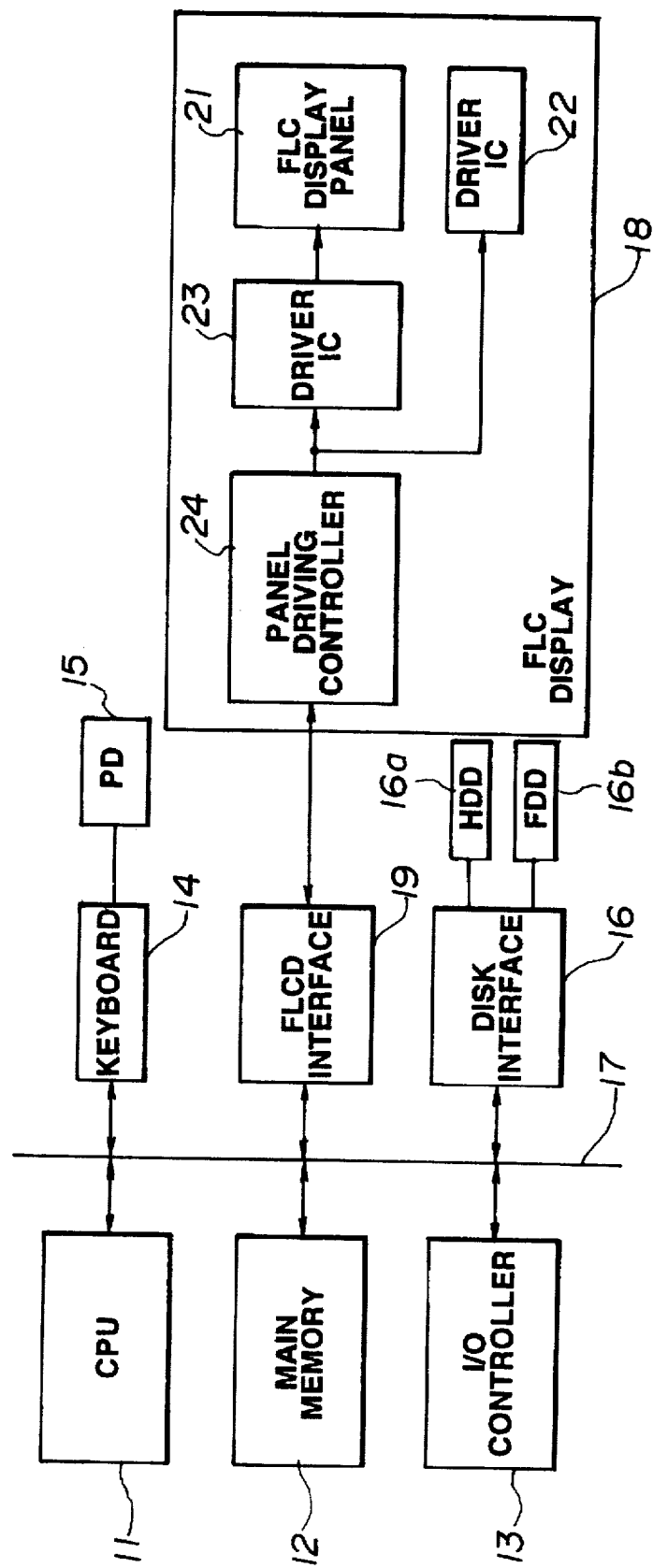
FIG. 1 is a block diagram illustrating the entire configuration of an information processing system according to a first embodiment of the present invention.

FIG. 1 is a block diagram illustrating the configuration of an information processing system, serving as an image processing apparatus, according to a first embodiment of the present invention.

In FIG. 1, a CPU 11 controls the entire image processing system. A main memory 12 stores processing programs used by the CPU 11, and is also used as work areas when the CPU 11 executes the programs. An input/output (I/O) controller 13 includes interfaces, such as RS-232C and the like. A keyboard 14 is used for inputting character information and control information from the user. Reference numeral 15 represents a pointing device (PD).

A disk interface 16 controls a hard-disk device 16a, serving as an external storage device, and a floppy-disk device 18b. A bus system 17 comprises a data bus, a control bus and an address bus for performing signal connection between the above-described respective units. A ferroelectric-liquid-crystal-display interface (hereinafter termed an FLCD interface) 19 realizes image processing in the present embodiment. Reference numeral 18 represents a ferroelectric-liquid-crystal display (hereinafter termed an FLCD).

In the FLC 18, an FLC display panel 21 comprises a ferroelectric liquid crystal sealed between two glass plates, each having a matrix-shaped electrode thereon, subjected to orientation processing. An information electrode (not shown) and a scanning electrode (not shown) are connected to driver IC's 22 and 23, respectively. A panel driving controller 24 controls a panel driving operation. The FLCD used in the present embodiment comprises a monochromatic display (having two gray-scale values) having a size of 15 inches, a vertical resolution of 1024, and a horizontal resolution of 1280.

Figure 2:
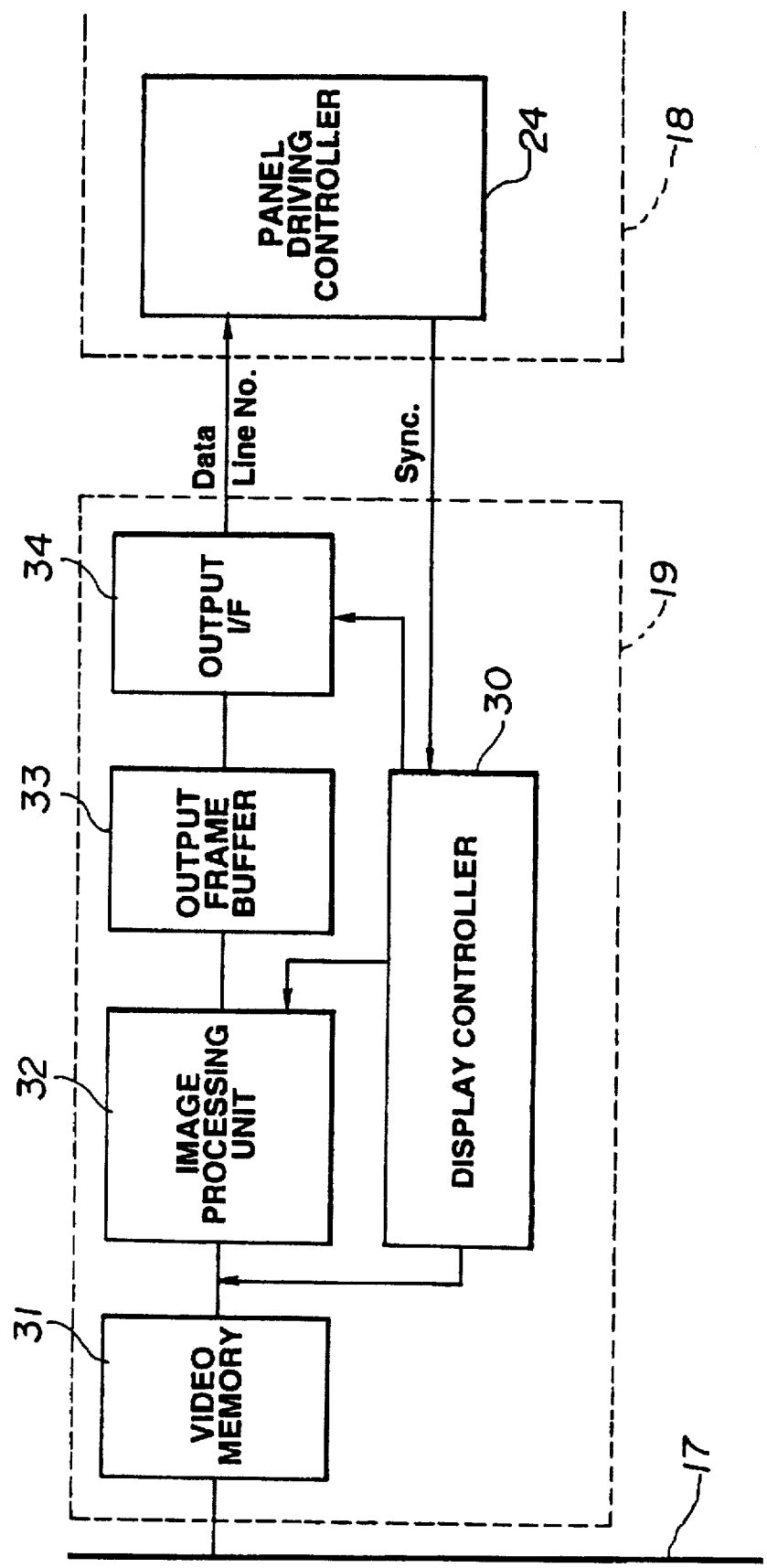
FIG. 2 is a block diagram illustrating the internal configuration of an FLCD interface shown in FIG. 1.

FIG. 2 is a block diagram illustrating the internal configuration of the FLCD interface 19 shown in FIG. 1. In FIG. 2, a display controller 30 reads image data (multi-value data including halftone) from a video memory 31. The read image data is input to an image processing unit 32, where predetermined image processing is performed. Display data (a binary value representing black and white) obtained by the processing in the image processing unit $2 is stored in an output frame buffer $3. The output frame buffer 33 stores data corresponding to white/black (on/off) on the FLCD 18.

An output I/F 34 reads display data for a certain line from the output frame buffer 33, combines that data with scanning-line address information indicating a scanning line for displaying the data (Data, Line No. shown in FIG. 2), and transmits the combined data to the panel driving controller 24. The panel driving controller 24 displays the transmitted display data on a scanning line corresponding to the scanning-line address information.

The image processing unit 32 performs image processing of multi-value data transmitted from the video memory 31, and outputs display data conforming to panel specifications of the FLCD 18. In the present embodiment, data input from the video memory 31 comprises 8 bits (256 gray scales), and display data output to the output frame buffer 33 comprises one bit (two gray scales). The display controller 30 can also prohibit a writing operation of display data output from the image processing unit 32 in the output frame buffer 33.

In the present embodiment, it is also intended to increase the speed of error diffusion processing. That is, in the information processing system of the present embodiment, the image processing unit 32 is divided into two portions. One of the portions processes the upper half portion of the video memory 31, and the other portion processes the lower half portion of the video memory 31, independently of each other, thereby increasing the processing capability by two-fold.

Figure 3:
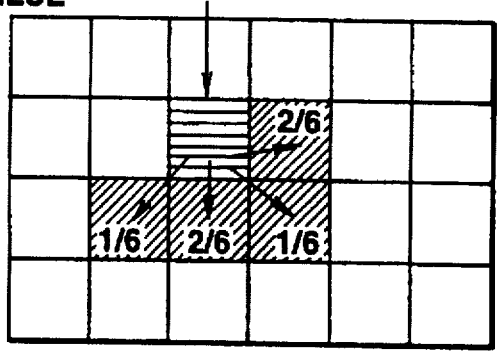
FIGS. 3 through 13 are diagrams illustrating results of image processing by an error diffusion method according to the first embodiment.

FIG. 3 illustrates the "error diffusion method" used in the present embodiment in order to explain image processing within the image processing unit 32. In this case, a determined value (a value representing black or white, whichever is closer to input brightness data) is selected for the input value (brightness data) of an input pixel. An error between the input value and the determined value is diffused while performing a weighting operation for unprocessed surrounding pixels.

As shown in FIG. 3, in the error diffusion method, the error is generally diffused not only in the horizontal direction, but also in downward directions. Accordingly, the image processing unit 32 includes a line buffer capable of storing data of at least one line.

The image processing unit 32 performs error diffusion processing by reading data of one line. At that time, the produced error is instantaneously diffused in the horizontal direction. The error is diffused to the next line by storing error values to be diffused in downward directions in the line buffer and adding the stored values to data of the next line when the data of the next line have been read.

A description will now be provided of a method for improving the quality of an image subjected to error diffusion processing in the present embodiment.

FIGS. 4 through 8 are diagrams illustrating the method for improving the quality of an image in the vicinity of a line where error diffusion processing starts.

Figure 4:
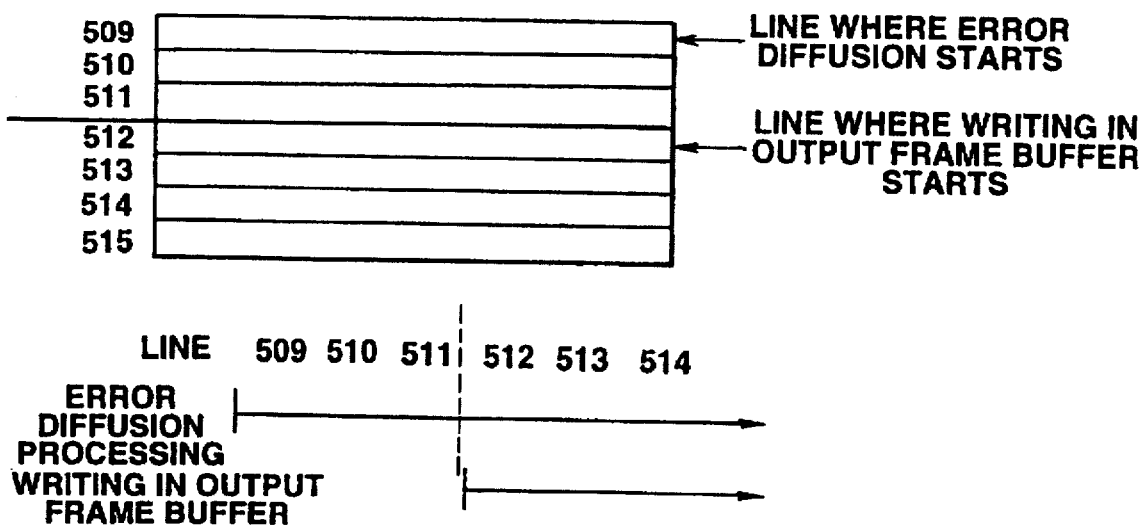

FIG. 4 illustrates a case in which the result of error diffusion processing from a line (line 512 in FIG. 4) is output to a display frame buffer. In the present embodiment, error diffusion processing is started from a line a few lines above the target line. That is, the processing is performed in the sequence of lines 509, 510 and 511.

However, the result of the processing is not written in the output frame buffer 33. The writing of the result of the processing in the output frame buffer 33 is started from line 512 followed by lines 513, 514, . . . .

Figure 5:
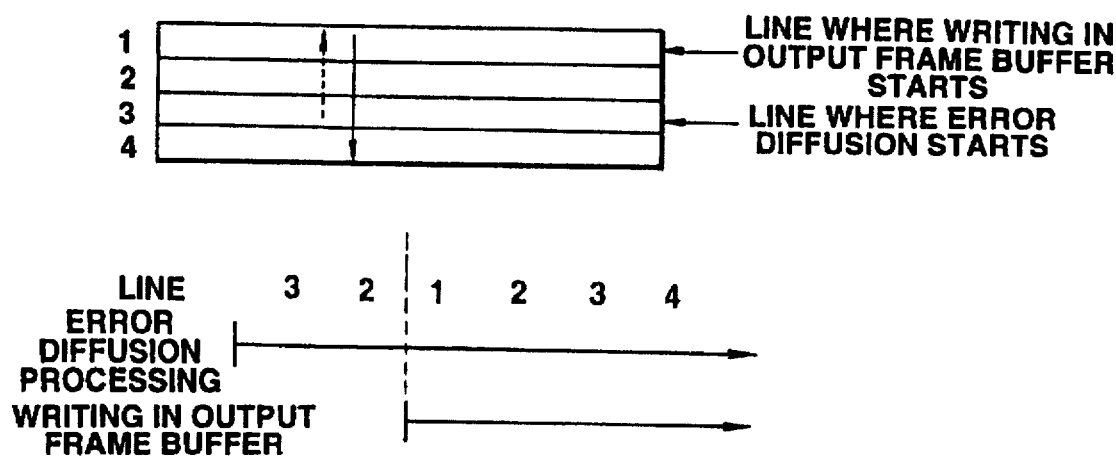

FIG. 5 is a diagram illustrating a case in which the result of error diffusion processing from a line (line 1) is output to the display frame buffer. In this case, error diffusion processing is performed in the reverse direction from line 3 to line 2, but the result of the processing is not written in the output frame buffer 33. The direction of the error diffusion processing is reversed when it has reached line 1. The writing of the result of the processing in the output frame buffer 33 is performed in the sequence of lines 1, 2, 3, . . . .

Figure 6:
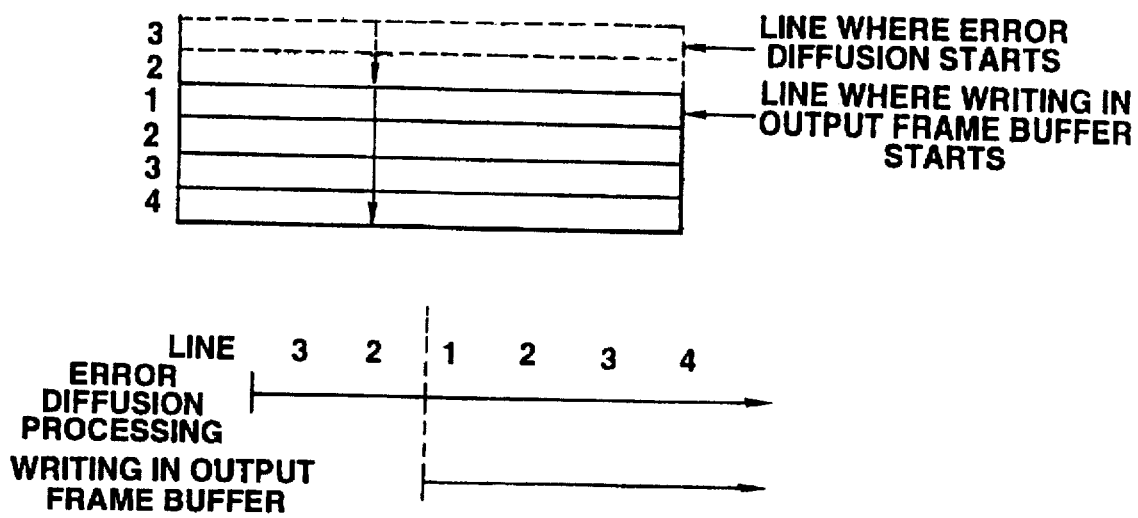

The same effects can be obtained when, as shown in FIG. 6, lines 2 and 3 are copied in operational regions which are physically or virtually provided outside the upper end of the image, and the same processing as that shown in FIG. 4 is performed from the upper end of image data including the operational regions.

Figure 7:
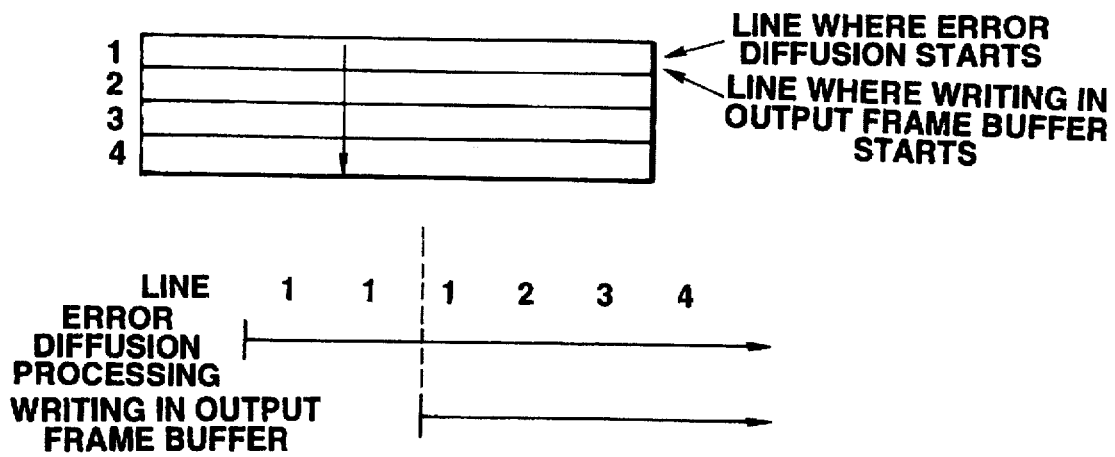

In the case of FIG. 7, the image processing of line 1 is first repeated twice, but the result of the processing is not written in the output frame buffer 33. Thereafter, the processing is performed in the sequence of lines 1, 2, 3, . . . , and the result of the processing is written in the output frame buffer 33.

Figure 8:
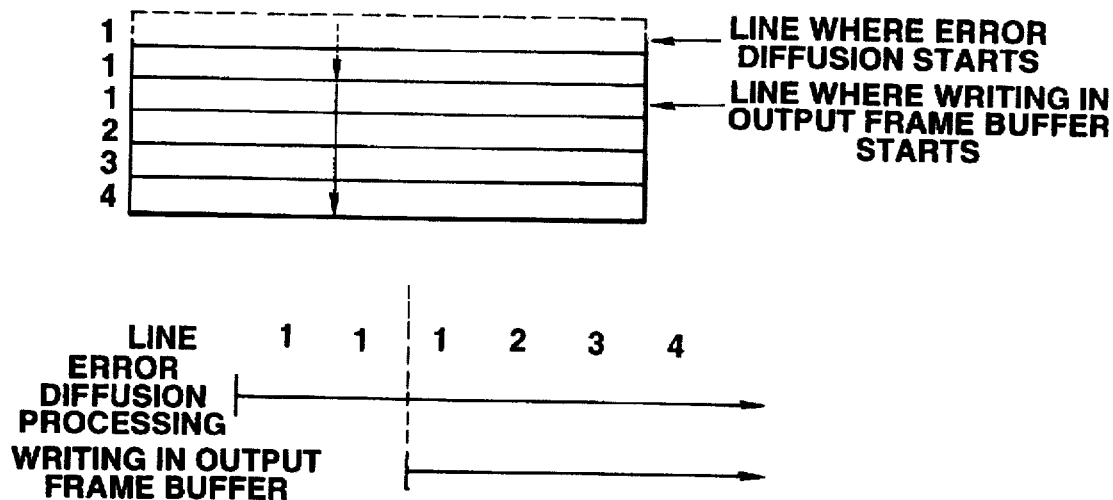

The same effects can be obtained when, as shown in FIG. 8, line 1 is copied a plurality of times in operational regions which are physically or virtually provided outside the upper end of the image, and the same processing as that shown in FIG. 4 is performed from the upper end of image data including the operational regions.

Next, a description will be provided of a method of improving the quality of a portion of an image in the vicinity of, e.g., the upper left end of the image.

FIGS. 9 through 13 are diagrams illustrating the method of improving the quality of a portion of an image in the vicinity of the upper left end of the image in the present embodiment.

Figure 9:
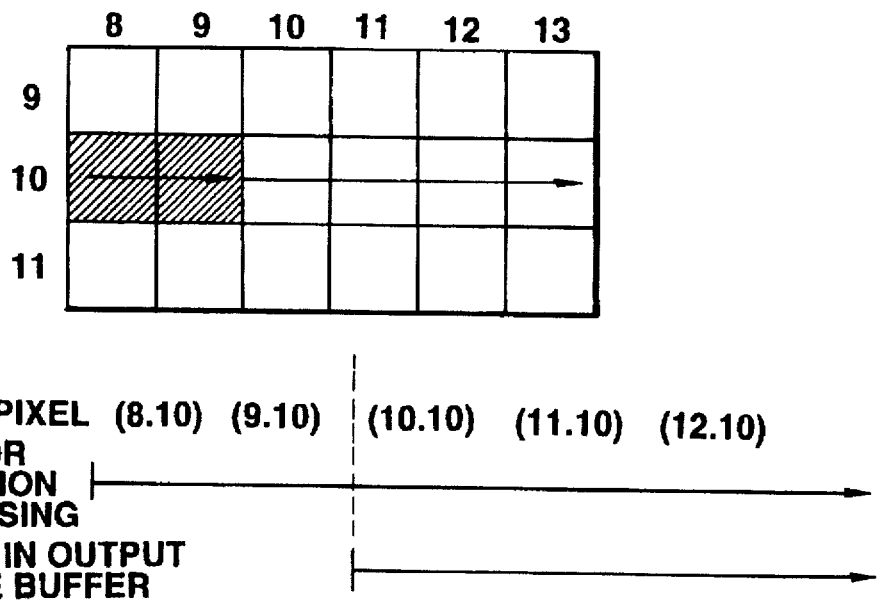

FIG. 9 is a diagram illustrating a case in which the result of error diffusion processing from a pixel (indicated by coordinates (10, 10) in FIG. 9) is output to the display frame buffer. In this case, the error diffusion processing is performed from a pixel a few pixels before the target pixel (the left side in FIG. 9). That is, the processing is performed in the sequence of pixels (8, 10), (9, 10), . . . , but the result of the processing is not written in the output frame buffer 33.

The writing of the result of the processing in the output frame buffer 33 is performed in the sequence of pixels (10, 10), (11, 10), (12, 10), . . . .

Figure 10:
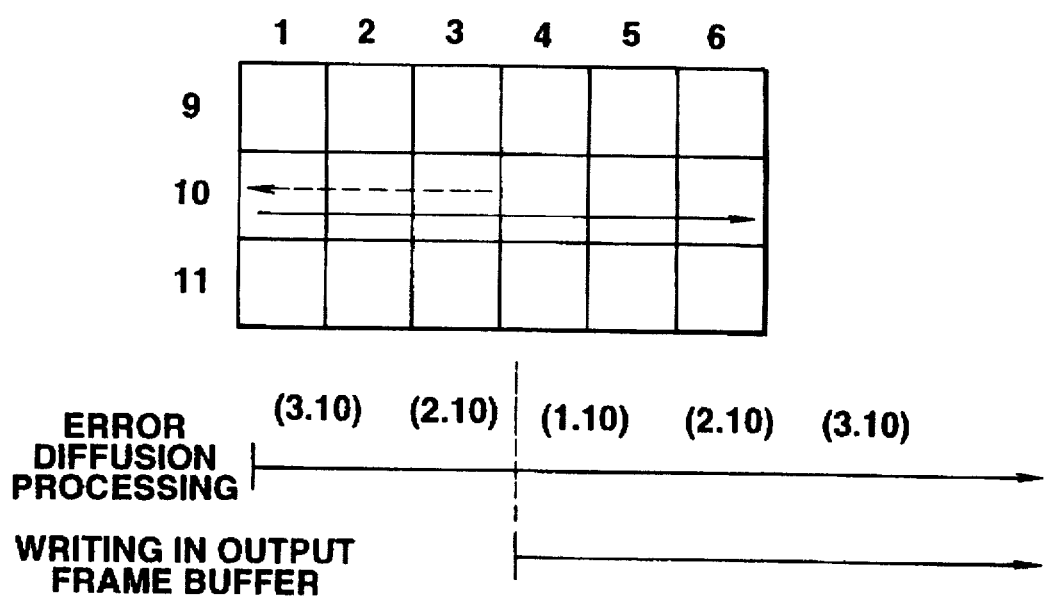

FIG. 10 illustrates a case in which the result of error diffusion processing from a pixel (coordinates (1, 10)) is output to the display frame buffer. In this case, the error diffusion processing is performed in the reverse direction from pixel (3, 10) to pixels (2, 10) and (1, 10), but the result of the processing is not written in the output frame buffer 33. The direction of the processing is reversed at pixel (1, 10), and the writing of the result of the processing in the output frame buffer 33 is performed in the sequence of pixels (1, 10), (2, 10), (3, 10), . . . .

Figure 11:
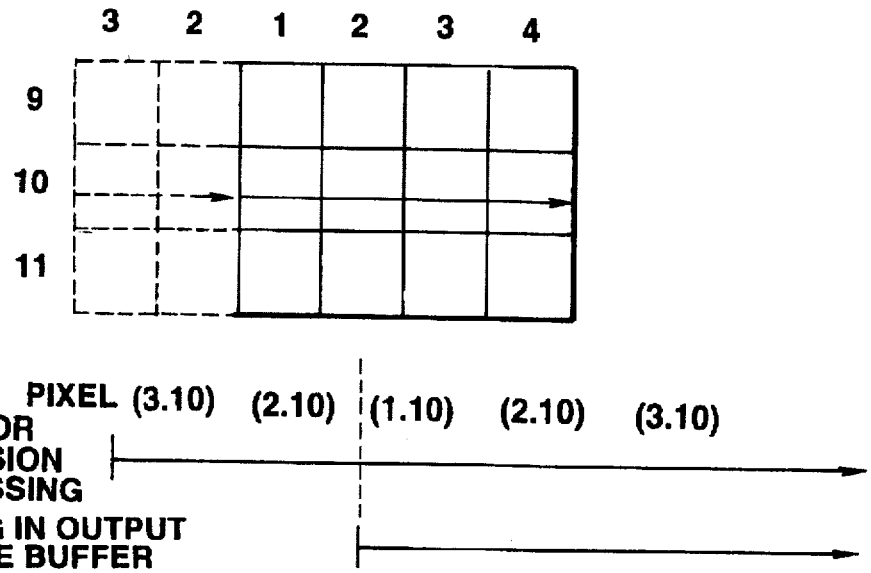

The same effects can be obtained when, as shown in FIG. 11, operational regions are physically or virtually provided outside the left end of the image, pixels (1, 10), (2, 10) and (3, 10) are copied in these regions, and the same processing as that shown in FIG. 9 is performed from the left end of image data including the operational regions.

Figure 12:
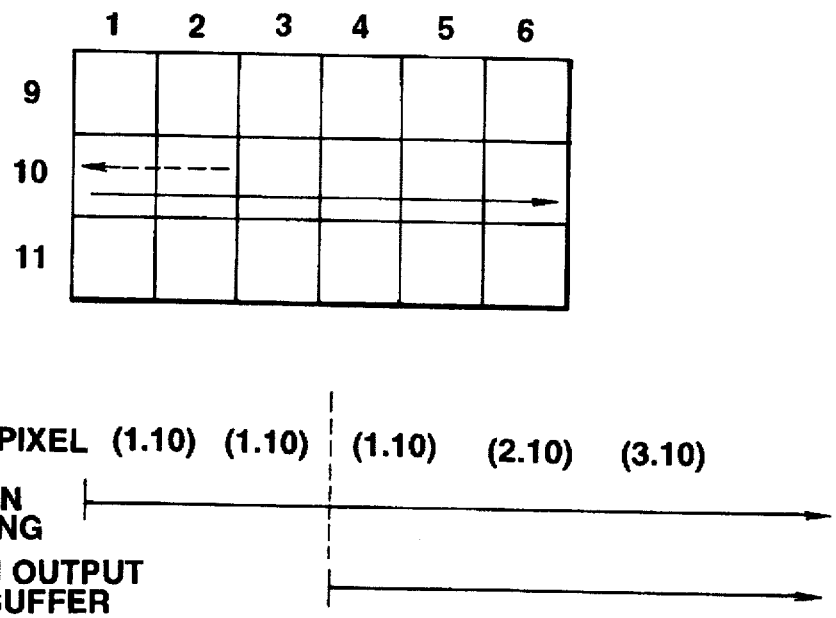

In processing shown in FIG. 12, the image processing of pixel (1, 10) is first repeated twice, but the result of the processing is not written at that time. Thereafter, the result of the processing is written in the output frame buffer 33 in the sequence of (1, 10), (2, 10), (3, 10), . . . .

Figure 13:
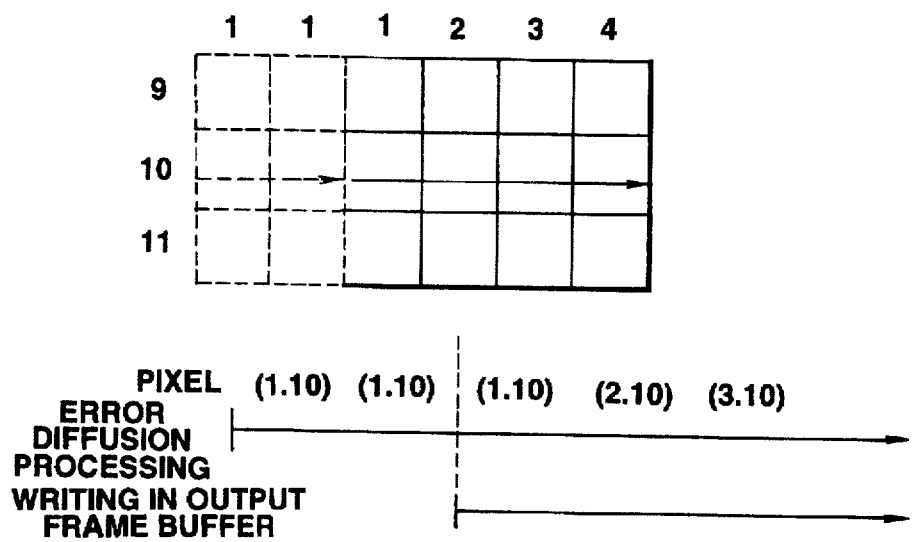

The same effects can be obtained when, as shown in FIG. 13, operational regions are physically or virtually provided outside the left end of the image, pixel (1, 10) is copied in these regions a plurality of times, and the same processing as that shown in FIG. 9 is performed from the left end of image data including the operational regions.

Figure 14:
FIG. 14 is a diagram illustrating a result of image processing by the error diffusion method according to the first embodiment.
Figure 15:
FIGS. 15 through 17 are diagrams illustrating results of image processing by a conventional error diffusion method.

In any of the above-described cases, image processing for a few pixels or a few lines has already been performed when the output of the result of the processing is started (preprocessed error diffusion). Hence, it is possible to prevent insufficient error diffusion. FIG. 14 illustrates an image obtained by the image processing of the present embodiment. As is apparent from comparison of this image with the result of image processing by the conventional error diffusion method shown in FIG. 15, in the image processing of the present embodiment, "solid" display in the vicinity of the line where error diffusion starts, e.g., the left end, can be prevented, and degradation of halftone representation can be improved.

In order to improve the picture quality and halftone representation, it is important to perform "preprocessed error diffusion" in the vicinity of the line where the output of the result of image processing is started, as in the present embodiment.

As described above, in the above-described first embodiment, by performing image processing for a few pixels or a few lines as preprocessed error diffusion before the output of the result of the processing is started, it is possible to prevent insufficient error diffusion, and "solid" display in the vicinity of the line where error diffusion starts, e.g., the left end, can be prevented, and degradation of halftone representation can be improved.

Although the display system shown in the above-described embodiment uses monochromatic two gray scales, the present invention is not limited to such an approach. For example, the same effects may also be obtained in a system which uses an FLC color panel comprising RGBW (4 bits/pixel) or RRGGBB (6 bits/pixel) pixels.

Although in the above-described embodiment, error diffusion processing is started from the upper left end of an image, the point where the processing starts and the direction of the processing are not limited to those shown in the above-described embodiment.

The present embodiment may be applied to a system comprising a plurality of apparatuses, or an apparatus comprising a single unit. The present embodiment may, of course, be applied to a case in which the invention is achieved by supplying a system or an apparatus with programs.

As described above, according to the first embodiment of the present invention, by performing image processing for a few pixels or a few lines before the output of the result of the processing is started, it is possible to improve the picture quality by error diffusion processing, and to realize excellent halftone representation even on a display represented by binary values or small gradation values.

Second Embodiment

Next, a description will be provided of a second embodiment of the present invention, in which when a display using a partial writing method by interlaced scanning is combined with the error diffusion method, a continuous displayed image can be provided.

More specifically, a description will be provided of a case in which, when processing data of the first line of a band (comprising a plurality of lines) to be partially rewritten by the error diffusion method, error data, produced when the final line of the immediately preceding band has been processed, is stored in a memory, and the error data stored in the memory are used.

A description will be also provided of another case in which, when processing data of the first line of a band to be partially rewritten by the error diffusion method, processing is performed from data of a line a few lines above the target line, as shown in the first embodiment.

Figure 18:
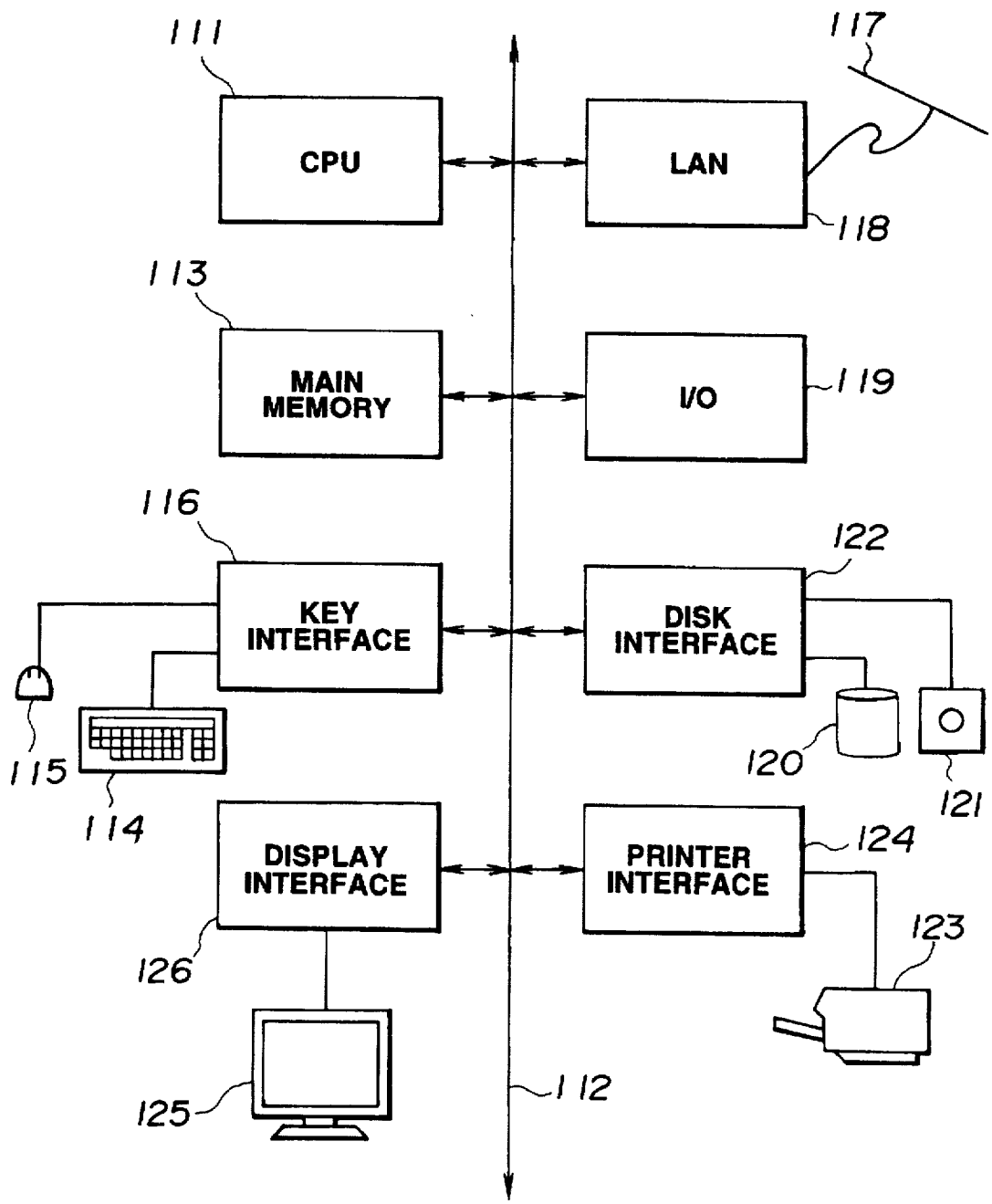
FIG. 18 is a block diagram illustrating the configuration of an information processing system including a display control apparatus according to a second embodiment of the present invention.

FIG. 18 is a block diagram illustrating the configuration of an information processing system for displaying various kinds of characters, image information, and the like, which includes a display control apparatus according to the second embodiment.

In FIG. 18, a CPU 111 controls the entire image processing system. A main memory 113 stores programs executed by the CPU 111, and is also used as work areas when the programs are executed. A keyboard 114 is used for inputting character information relating, for example, to various kinds of characters, control information, and the like. Reference numeral 115 represents a pointing device (PD). A key interface 116 performs signal connection between the keyboard 114 and the PD 115, and the image processing system.

A LAN (local area network) interface 117 is present between a LAN 118, such as Ethernet (the trademark of the Xerox Corporation), or the like, and the information processing system. An input/output device (hereinafter termed an I/O) 119 includes a ROM (read-only memory), an SRAM (static random access memory), an RS-232C-type interface, and the like. Various kinds of external apparatuses can be connected to the I/O 119.

Reference numeral 120 represents a hard-disk device, and reference numeral 121 represents a floppy-disk device, both serving as external storage devices. A disk interface 122 performs signal connection between the hard-disk device 120 and the floppy-disk device 121, and the information processing system. A printer 123 comprises an ink-jet printer, a laser-beam printer, or the like, which can perform recording with a relatively high resolution. A printer interface 124 performs signal connection between the printer 123 and the information processing system.

The display of a display device 125 is controlled by a display interface 126, serving as a display control device of the present embodiment. A system bus 112 comprises a data bus, a control bus and an address bus for performing signal connection between the above-described units.

In the information processing system configured by the above-described units, the user of the system generally performs operations in accordance with various kinds of information displayed on the display picture surface of the display device 125.

That is, character/image information and the like supplied from external apparatuses connected to the LAN 118 and the I/O 119, the keyboard 114, the PD 115, the hard-disk device 120 and the floppy-disk device 121, and operational information and the like stored in the main memory 113 and operated by the user are displayed on the display picture surface of the display device 125. The user performs editing of information and instruction operations for the system while watching the display. The above-described units constitute means for supplying the display device 125 with display information.

Figure 19:
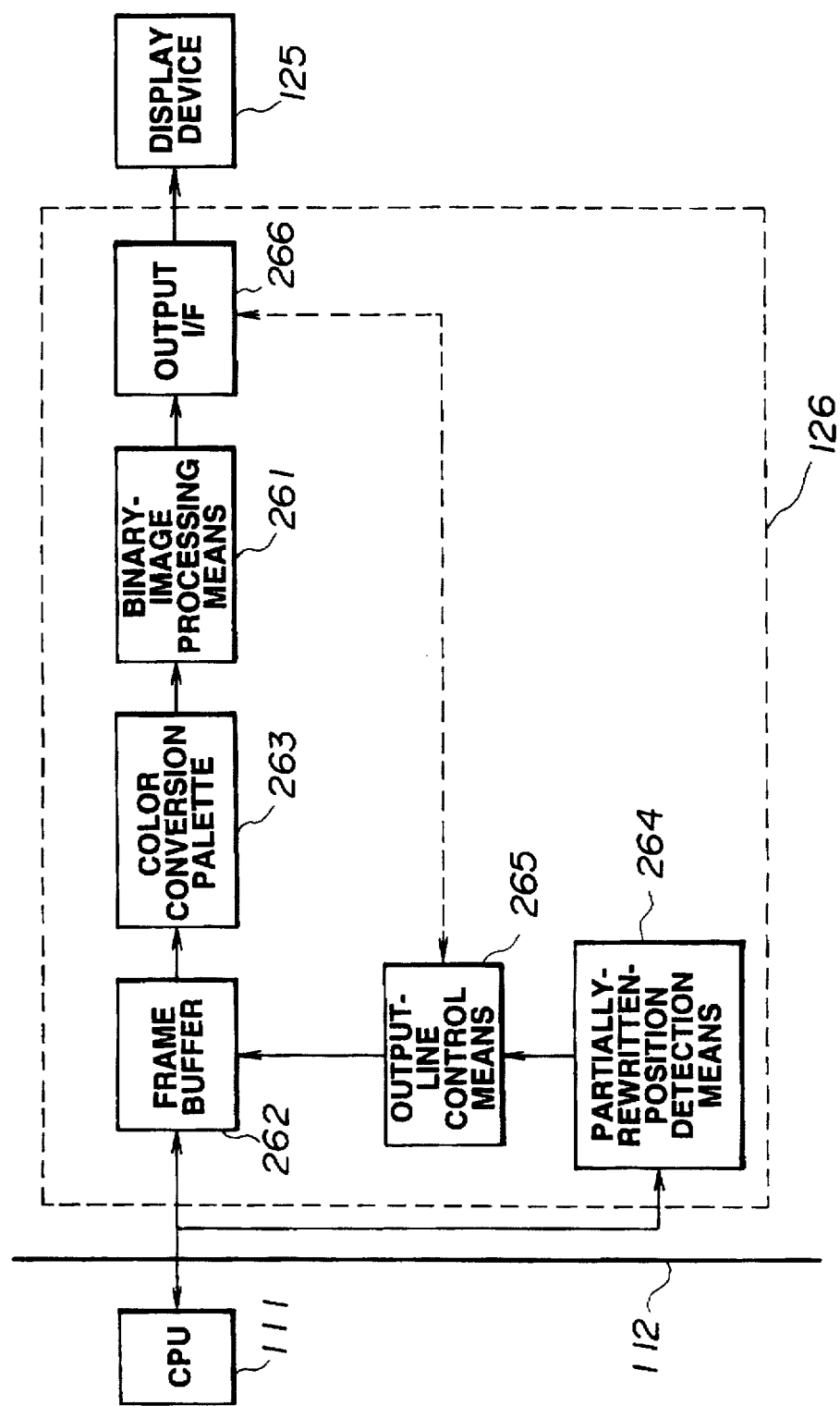
FIG. 19 is a block diagram illustrating the internal configuration of a display interface constituting the information processing system shown in FIG. 18.

FIG. 19 is a block diagram illustrating the internal configuration of the display interface 126 constituting the information processing system of the present embodiment.

In FIG. 19, data input from a host computer (not shown) is stored in a frame buffer 262 of the display interface 126. The output of the frame buffer 262 is controlled by output-line control means 265. In data output from the frame buffer 262, data for one frame is divided into a few bands in units of 8 lines (this unit will be hereinafter termed a band). Data of each band is transferred to a color conversion palette 263, and is converted into predetermined color data (R, G and B in the present case). The address in the display device 125 obtained from the output-line control means 265 is added to the data of each band subjected to halftone processing by binary-image processing means 261 in an output I/F 266, and the resultant data is output to the display device 125.

Figure 23:
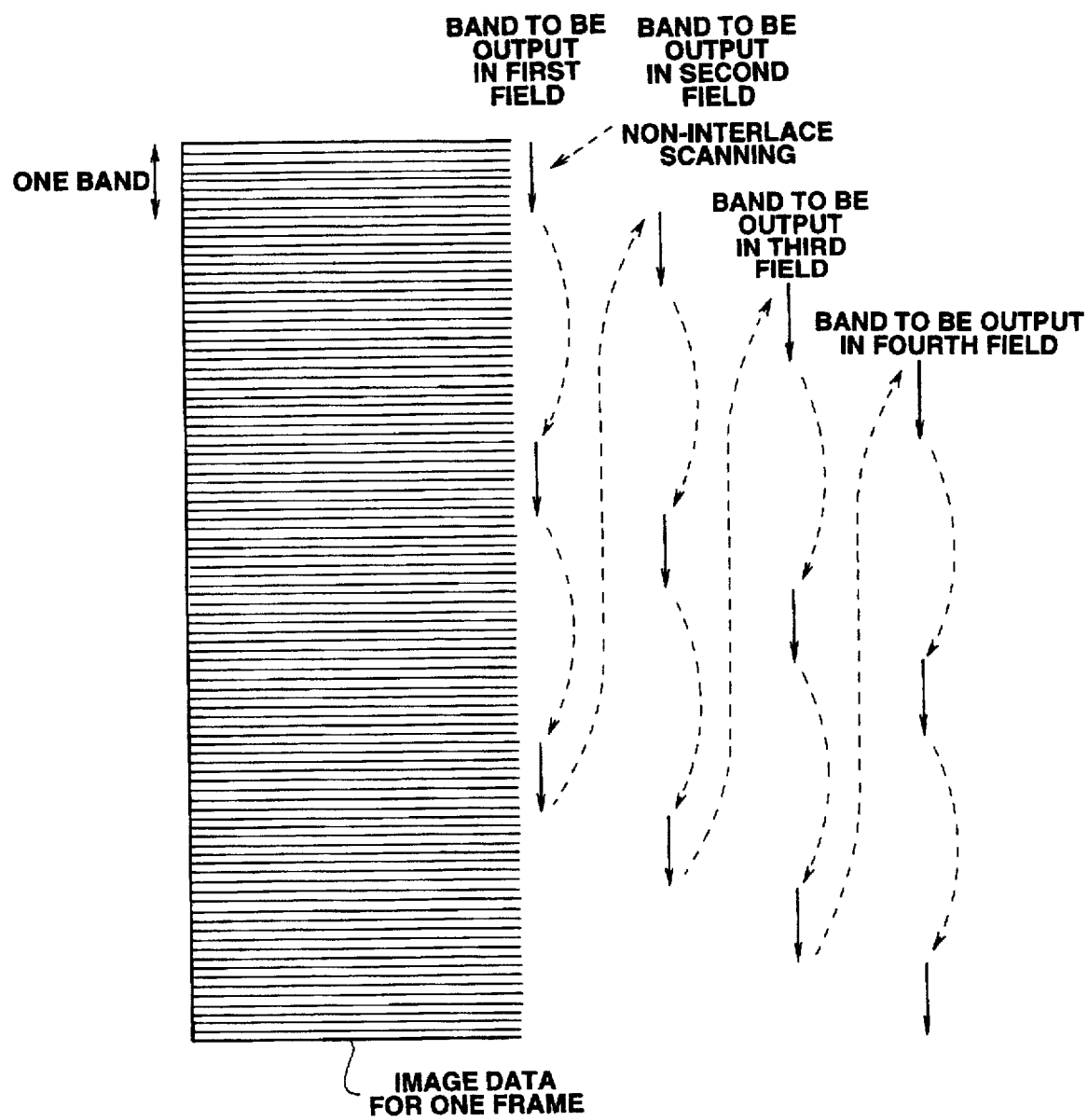
FIG. 23 is a diagram schematically illustrating a scanning sequence.

When outputting periodically refreshing (scanning) data from the frame buffer 262 (when displaying data of one frame), for example, as shown in FIG. 23, band data of every four bands is output. In the second field, data of a band immediately below the band output in the first field is output. The output of data for one frame is completed in four fields. In FIG. 23, broken lines indicate a display sequence. The display of each band is performed by non-interlaced scanning. Thus, display in the present embodiment is realized by non-interlaced scanning within a band, and multi-interlaced scanning in units of a band. The band output in each field may be arbitrarily selected from among the four bands.

Partially-rewritten-position detection means 264 shown in FIG. 19 checks data input from the host computer to detect a rewritten horizontal-direction line, and transmits information relating the detected line to the output-line control means 265. That is, the partially-rewritten-position detection means 264 detects a line where data different from data of the preceding frame is present, and notifies the output-line control means 265 of information relating to the detected line.

That is, when moving only a cursor within the displayed picture frame, a line where data has changed in accordance with the movement of the cursor is detected, and information relating to the detected line is related to the output-line control means 265. The output-line control means 265 controls a partial writing operation of preferentially updating a band including the rewritten line.

Figure 25:
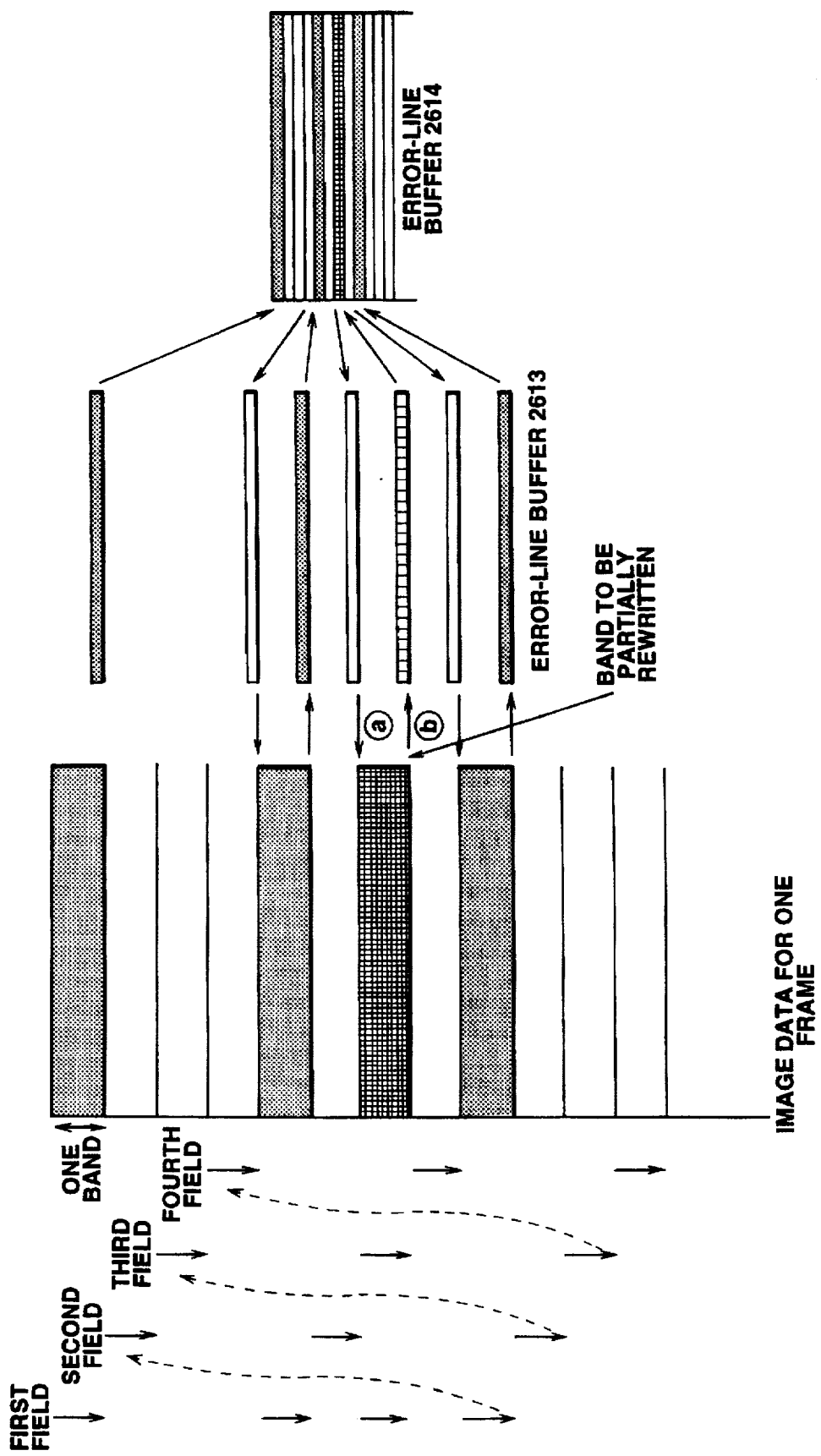
FIG. 25 is a diagram schematically illustrating partial writing control in the second embodiment.

The input of data of a band to be partially rewritten to the binary-image processing means 261 may be performed asynchronously with the input of data of a band to be periodically refreshed. Alternatively, as shown in FIG. 25, the input of data of a band to be partially rewritten may be subjected to convolution with the input of data of a band to be refreshed in the field.

Next, halftone processing by the binary-image processing means 261 in the present embodiment will be described in detail.

Figure 24:
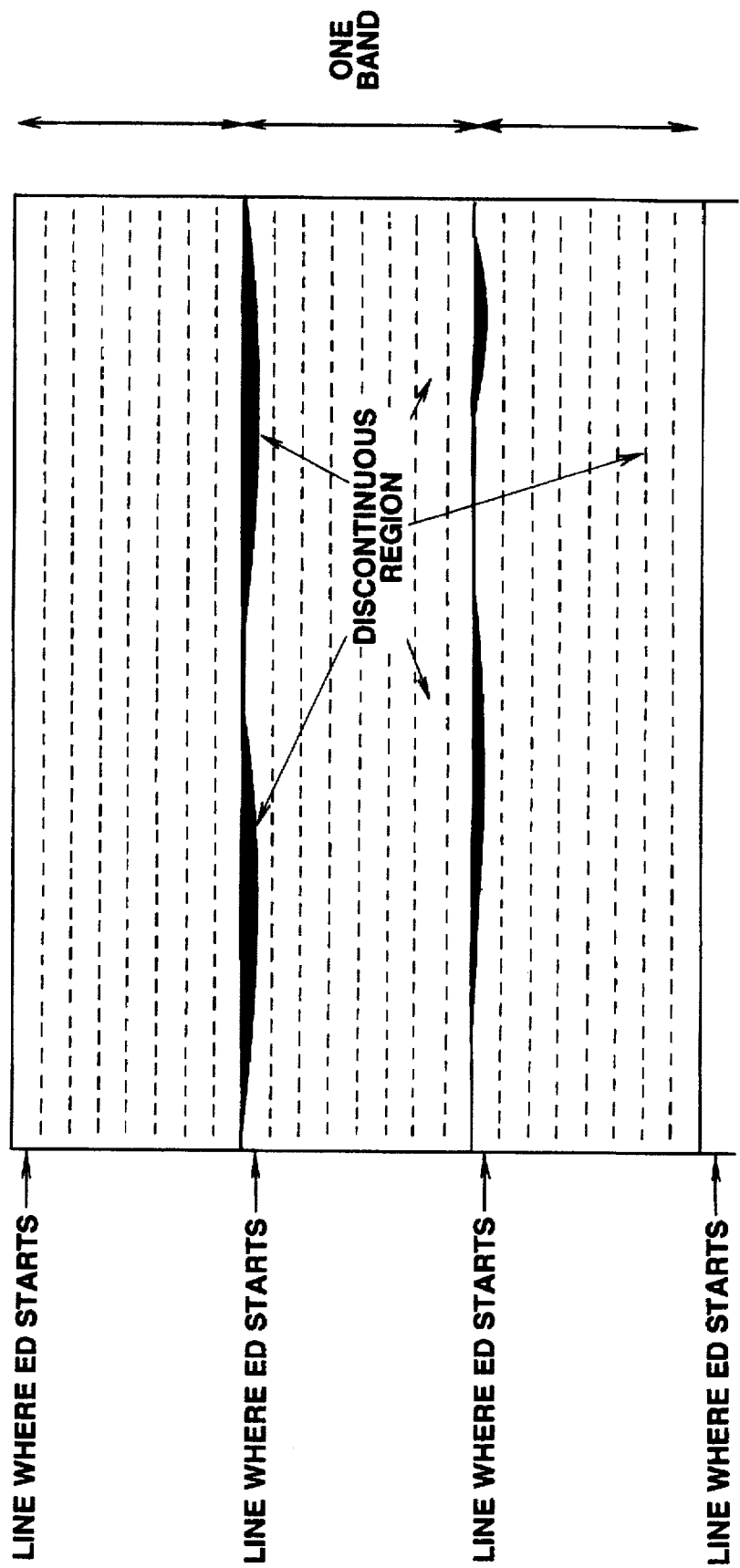
FIG. 24 is a diagram schematically illustrating discontinuous regions produced as a result of binary-image processing.

In the present embodiment, image processing by the ED method is performed in units of the above-described band. When performing ED processing of the first line of a band, error data from lines above that line are absent. Hence, when data subjected to ED processing for each band is displayed on the display device, discontinuous regions as shown in FIG. 24 appear.

Figure 20:
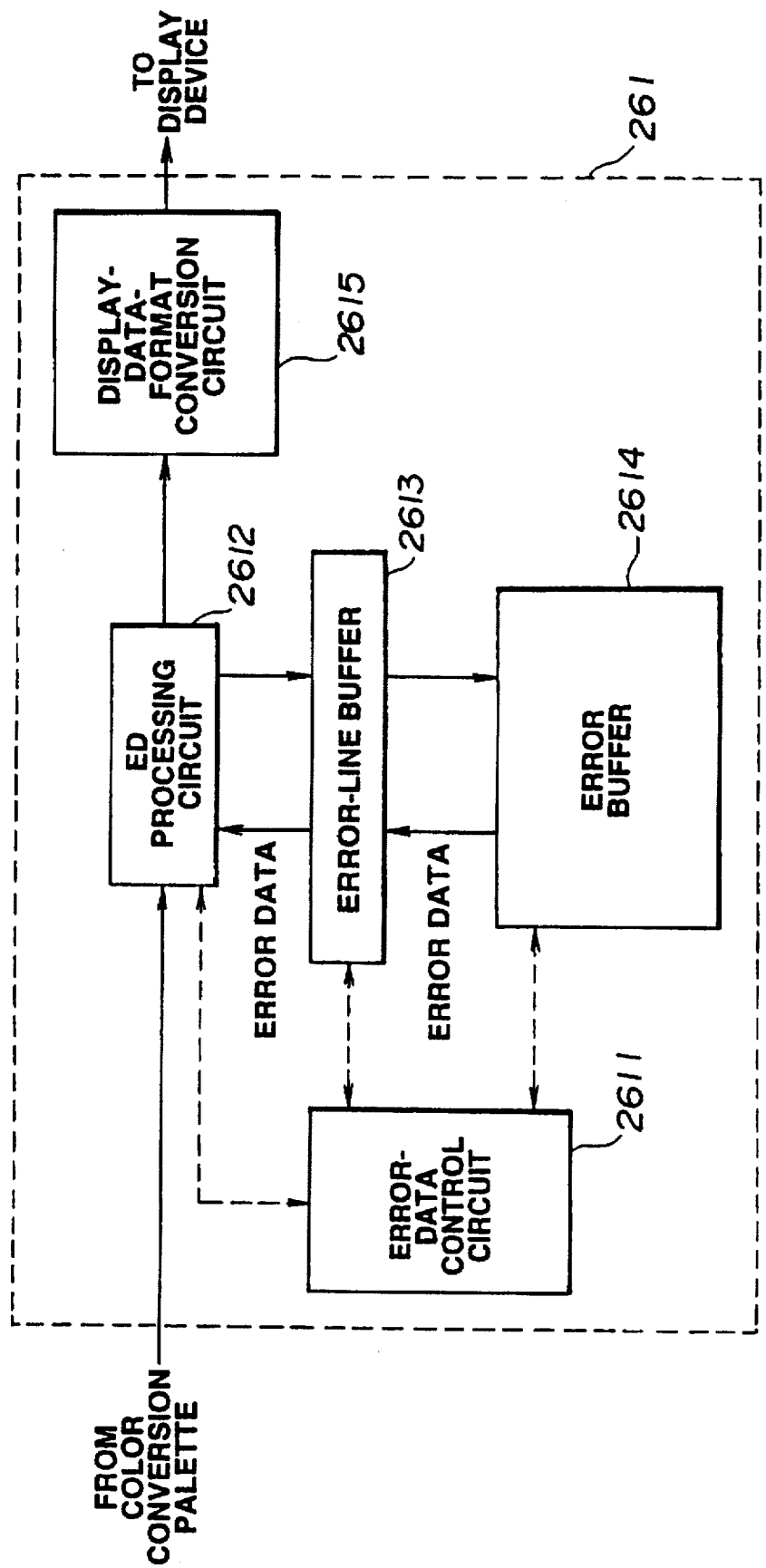
FIG. 20 is a block diagram illustrating the configuration of binary-image processing means shown in FIG. 19.
Figure 21:
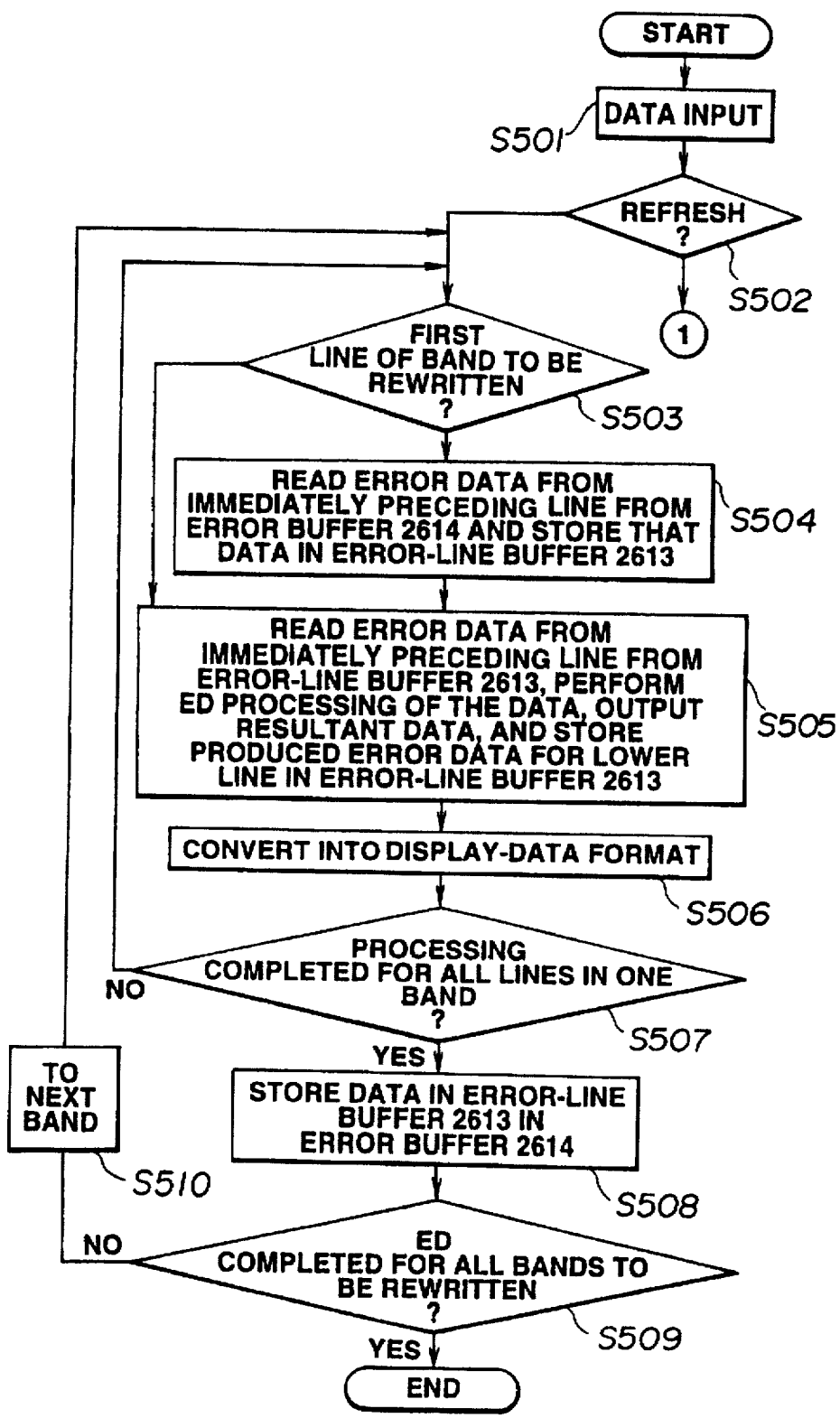
FIGS. 21 and 22 are flowcharts illustrating image processing procedures in the second embodiment.
Figure 22:
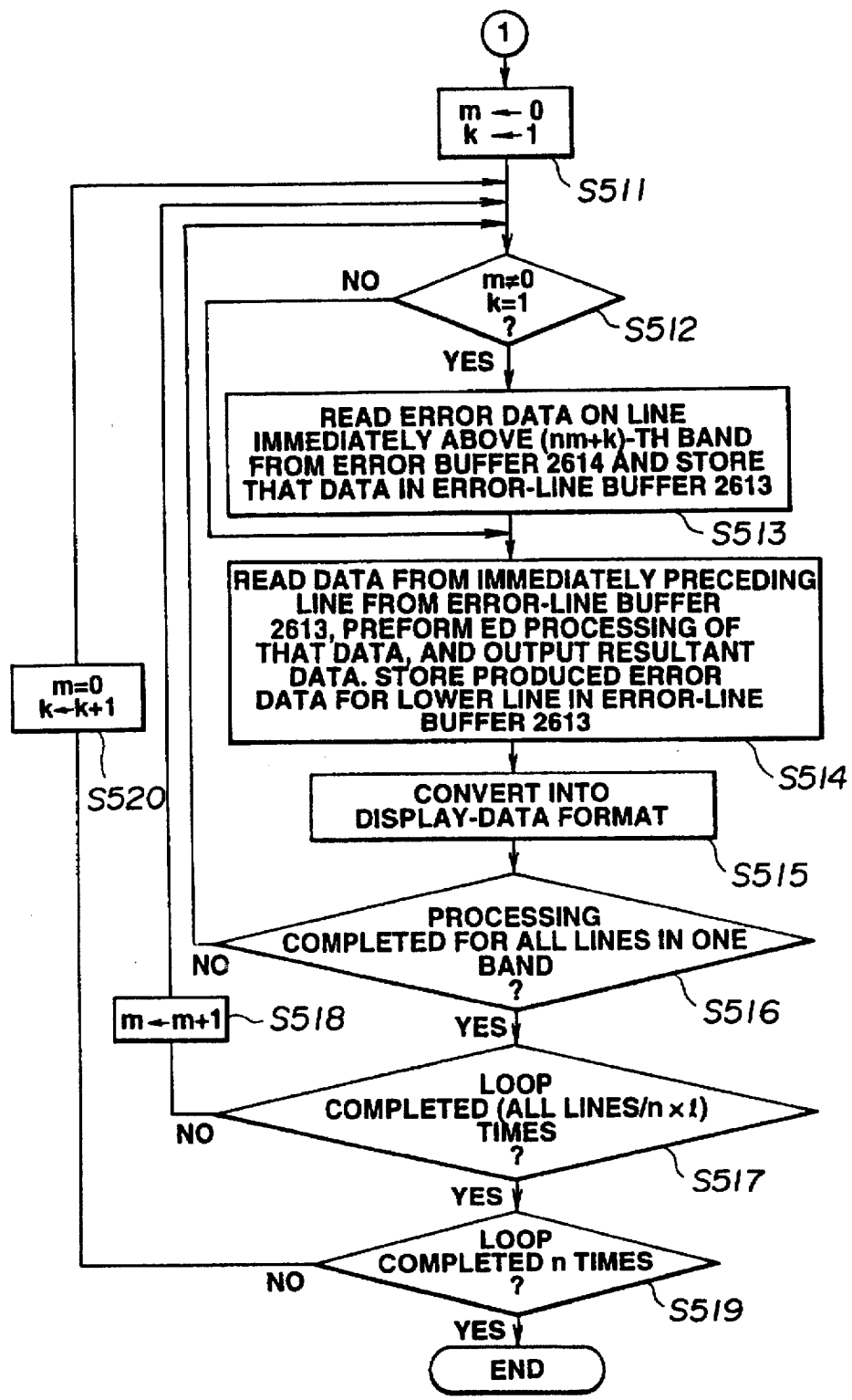

In the present embodiment, in order to solve the above-described problem, image processing according to the flowcharts shown in FIGS. 21 and 22 is performed by the binary-image processing means 261, whose internal configuration is shown in FIG. 20.

That is, if data input is present in step S501, more specifically, if data in units of a band is input from the color conversion palette 263 shown in FIG. 19 to an ED processing circuit 2612 shown in FIG. 20, the determination whether the data comprises data for partial rewriting or data for refreshing is performed in step S502. When it has been determined in step S502 that the data comprises data for partial rewriting, the process proceeds to step S503.

The first line must be processed first. Hence, in step S504, as shown in FIG. 25, error data (a) from a line immediately above the first line of the input data is read from an error buffer 2614, and the read data is written in an error-line buffer 2613. In the following step S505, the ED processing of the first line of the band to be rewritten is performed using this error data. Error data produced from the first line as a result of the processing is stored in the error-line buffer 2613.

In step S506, the data is converted by a display-data-format conversion circuit 2615 into a format such that the data can be output to the display device 125, and the converted data is output to the display device 125. The above-described processing is repeated until it is determined in step S507 that the processing has been completed for all lines in one band.

When performing the ED processing of the second line, error data produced from the first line is read from the error-line buffer 2613, the read data is subjected to ED processing, and produced error data is stored in the error-line buffer 2613.

The same processing is performed for other lines after the second line. When error data produced at the ED processing of the last line of the band to be rewritten has been stored in the error-line buffer 2613, the error data (ⓑ) shown in FIG. 25) is transferred to and stored in the error-line buffer 2614 in step S508. When it has been confirmed in step S509 that the above-described processing has been completed for all bands to be rewritten, the processing is terminated.

When it has been determined in step S502 that the input data is not data for partial rewriting but data for periodic refreshing, processing shown in FIG. 22 is performed.

That is, in step S511, parameters m and k (m=0, 1, 2, . . . , and k=1, 2, 3, . . . ) are initialized such that m and k are set to 0 and 1, respectively. As the first processing routine, the processing of step S513 is skipped, and the processing of steps S514–S516 is performed. Halftone processing by the binary-image processing means in this routine is the same as in the case of partial rewriting shown in steps S505–S507 shown in FIG. 21. Hence, a description thereof will be omitted.

When it has been determined in step S516 that the processing has been completed for all lines in one band, in step S517, it is determined if the above-described routine processing has been performed (all lines/(n×l)) times, where n is the number of interlaced operations in a normal state in which image processing is not performed (n=4 in the case of FIG. 23), and l is the number of lines in one band (l=8 in the case of FIG. 23). If the result of the determination is negative, the value of m is incremented by one in step S518.

As a result of the increment of the value of m in step S518, the determination in step S612 becomes affirmative. Hence, in step S513, error data from a line immediately above the (nm+k)-th band is read from the error buffer 2614, and the read data is written in the error-line buffer 2613. Thereafter, the processing of steps S514–S516 is performed in the above-described manner.

In step S519, it is determined if the above-described processing has been performed n times. If the result of the determination is negative, in step S520, parameters are changed, i.e., the value of k is incremented by one with m=0, and the process returns to the processing of step S512.

As described above, according to the present embodiment, image data to be processed is subjected to error diffusion processing while reflecting errors from lines above the line to be processed on the result of the processing for each band, comprising a plurality of lines, and the band including the line where rewriting of data has been completed is preferentially updated. It is thereby possible to display a moving image or a still image on a low-frequency-driven display device, which requires multi-interlaced scanning, by performing image processing by diffusing errors in downward directions of the line to be processed.

Modification

Next, a description will be provided of another halftone processing using the binary-image processing means 261 according to a modification of the second embodiment.

Figure 26:
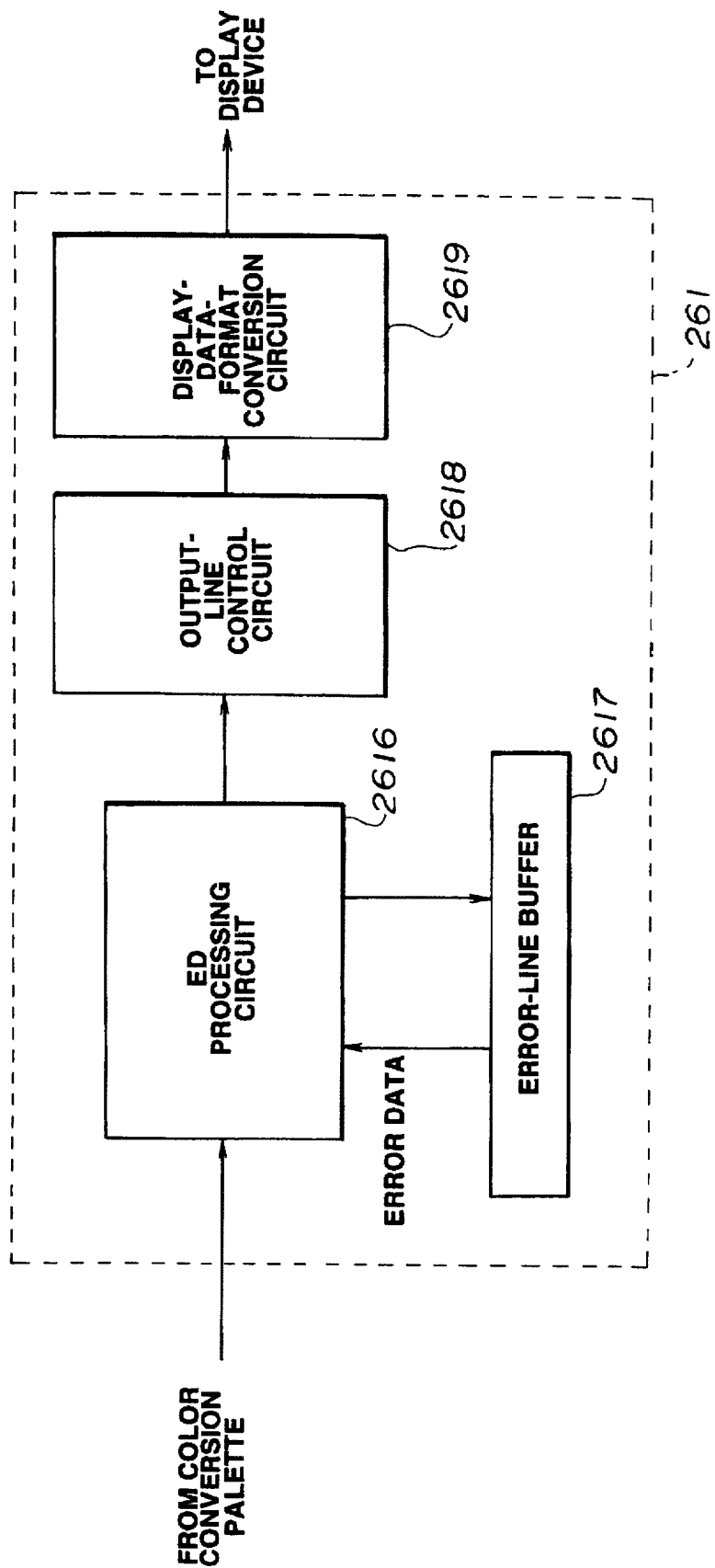
FIG. 26 is a block diagram illustrating the internal configuration of binary-image processing means according to a modification of the second embodiment.
Figure 27:
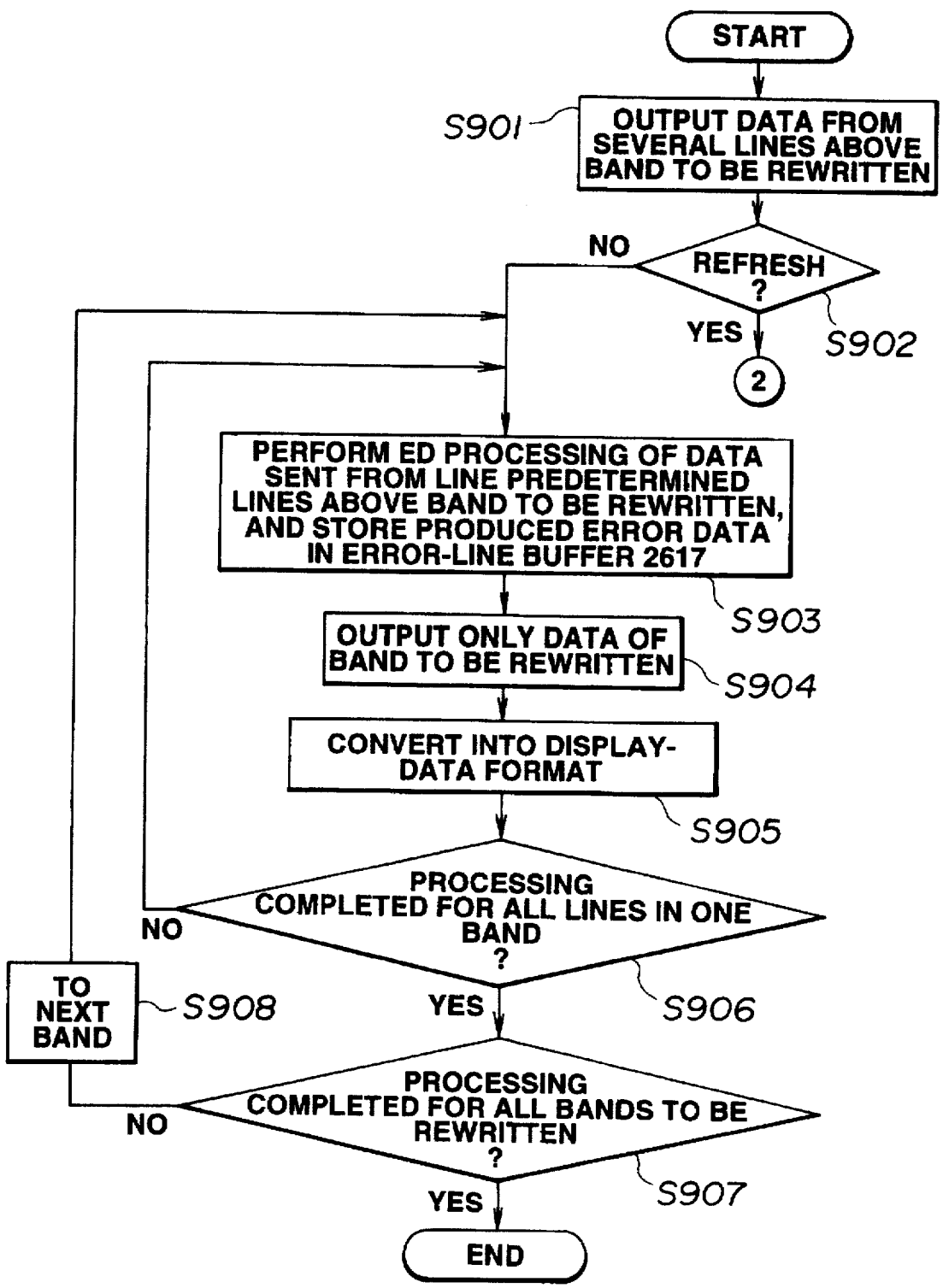
FIGS. 27 and 28 are flowcharts illustrating image processing procedures in the modification of the second embodiment.
Figure 28:
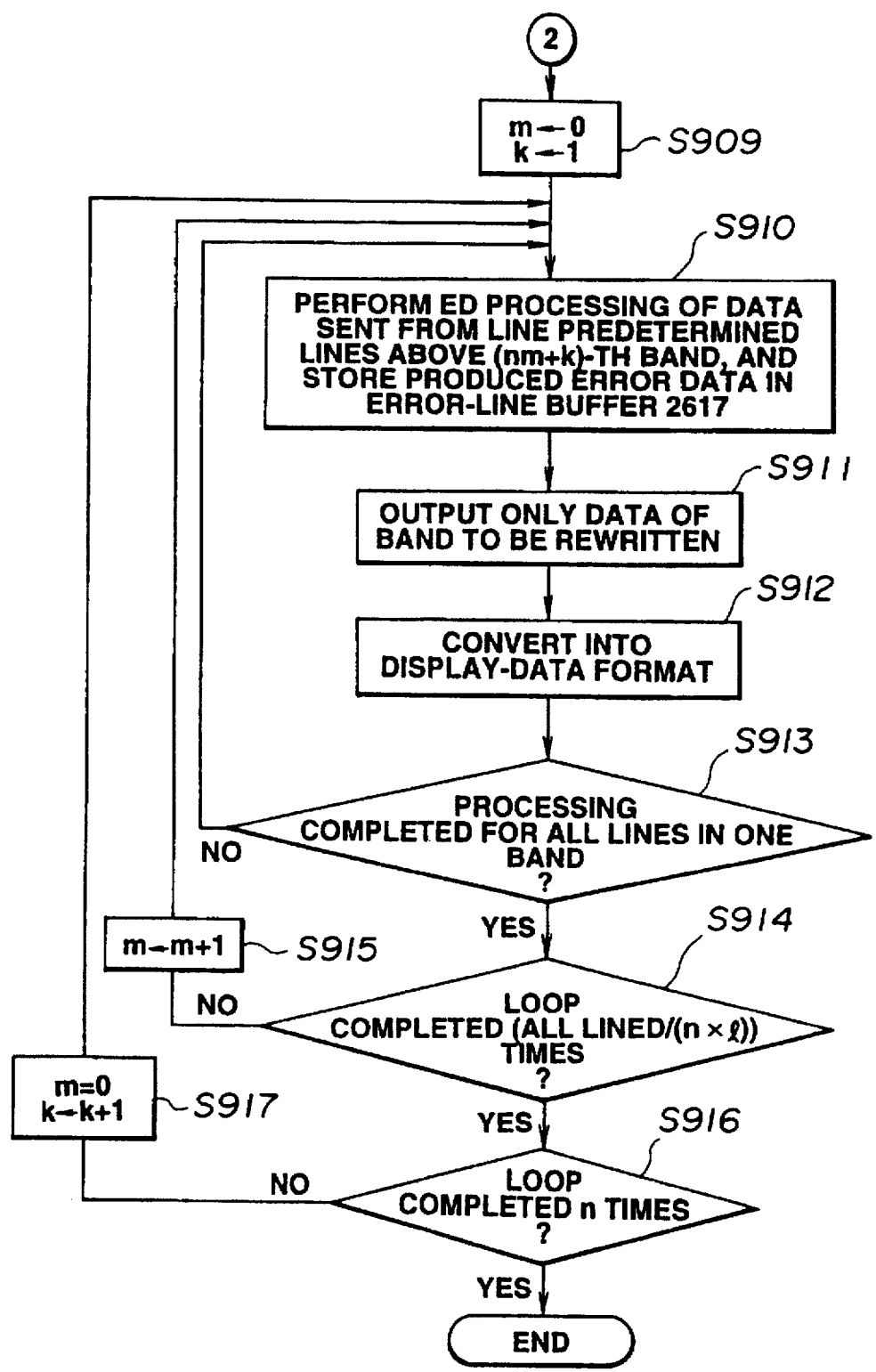

FIG. 26 is a block diagram illustrating the internal configuration of the binary-image processing means 261 of the present embodiment. FIGS. 27 and 28 are flowcharts illustrating halftone processing procedures in this modification.

Figure 29:
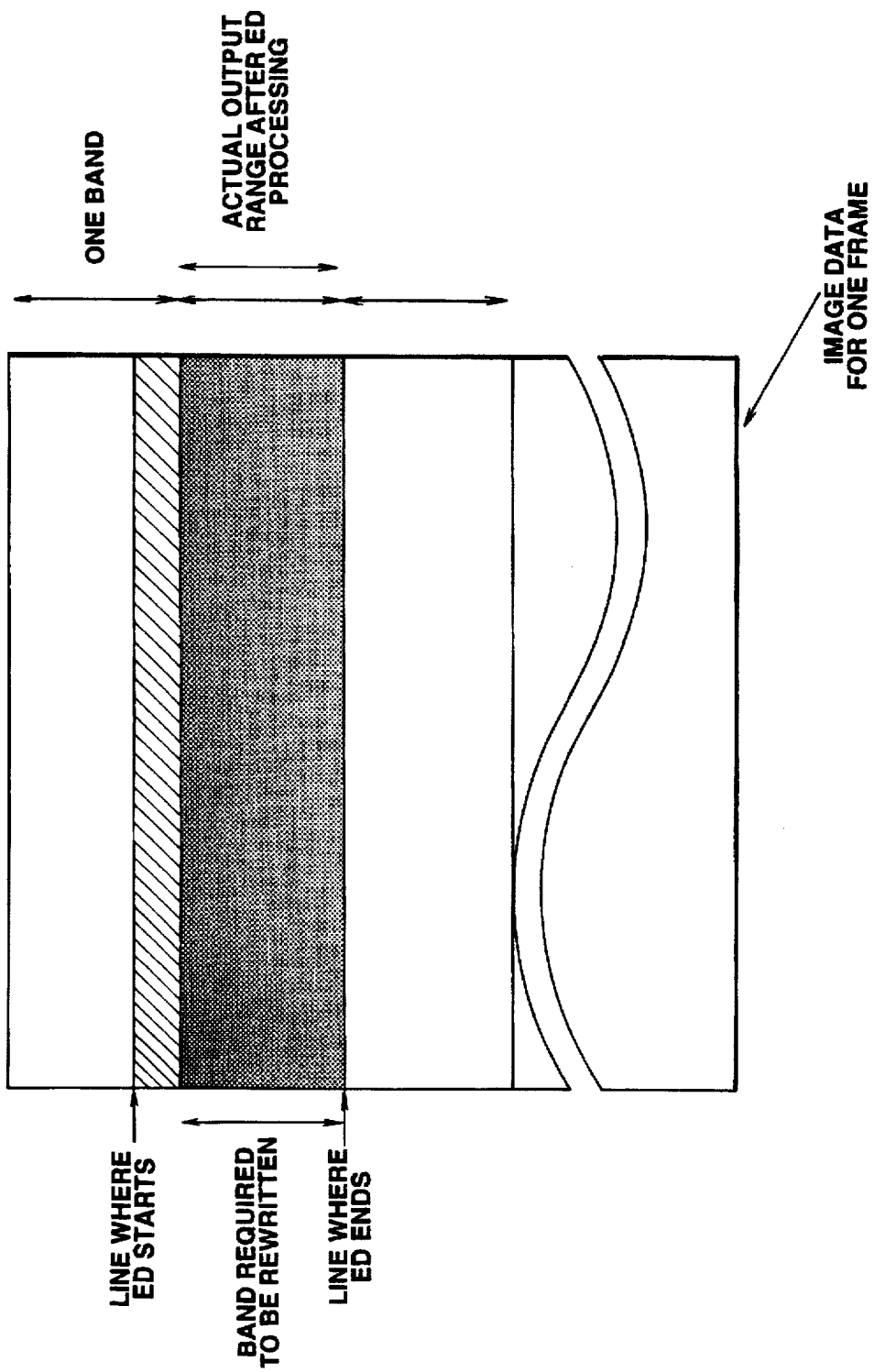
FIGS. 29 and 30 are diagrams schematically illustrating image processing in the modification of the second embodiment.
Figure 30:
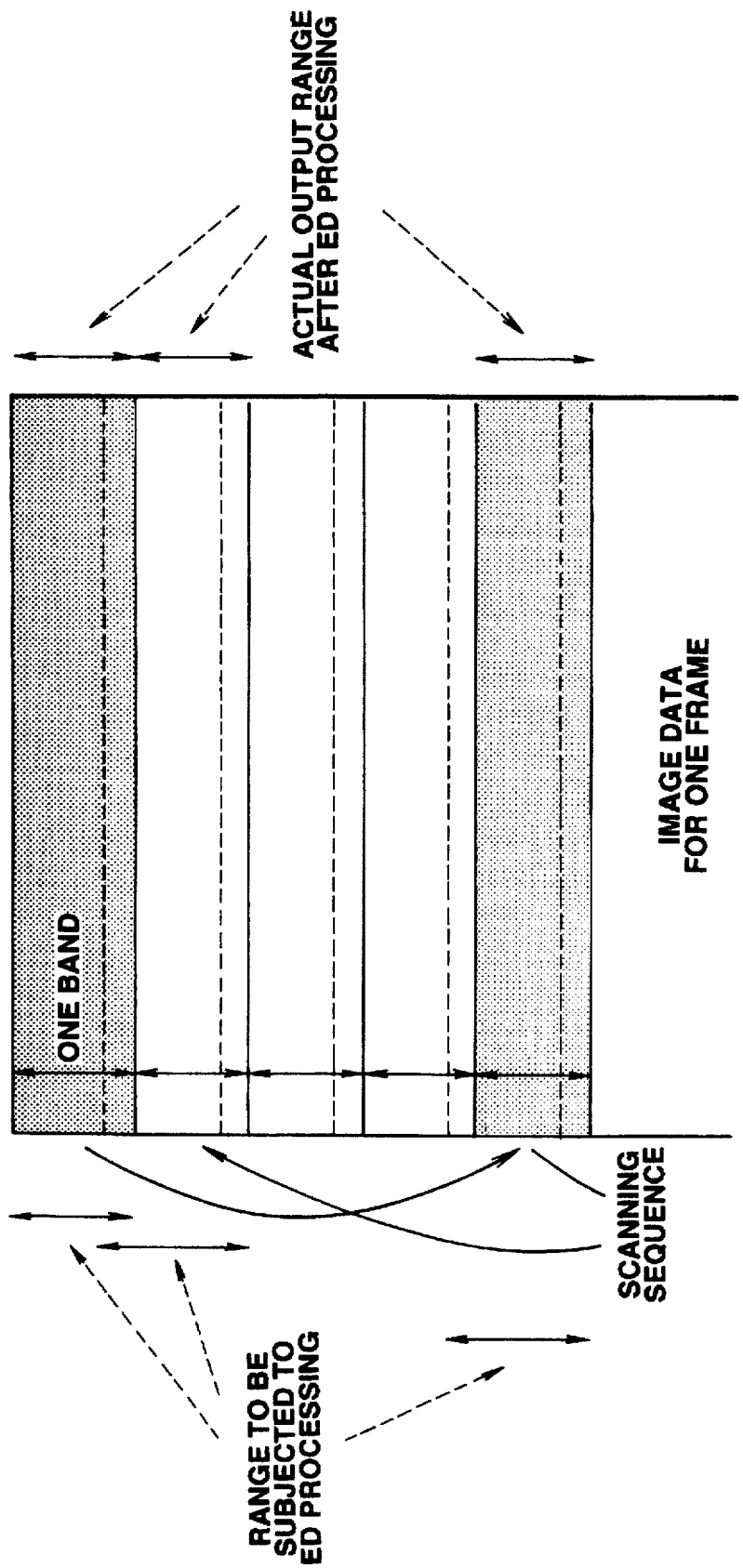

In step S901 shown in FIG. 27, when outputting data from the frame buffer 262 (see FIG. 19) in units of a band, data is output from a line a few lines above the band to be rewritten. More specifically, as shown in FIGS. 29 and 30, an ED processing circuit 2616 inputs data from five lines above the first line of the band to be output through the color conversion palette 263.

In step S903, ED processing is performed while storing error data for lower lines produced from the upper lines in an error-line buffer 2617, and error data for lower lines produced from the final line of one band is cleared.

In step S904, data for the extra five lines from among data subjected to ED processing by the ED processing circuit 2616 are cut by an output-line control circuit 2618, and only data for one band which must originally be output is output. In the following step S905, the data is converted into a format such that the data can be output to the display device by a display-data-format conversion circuit 2619, and the converted data is output to the display device.

In step S906, it is checked if the above-described processing has been completed for all lines in one band. If the result of the determination is affirmative, in step S907, it is checked if the above-described processing has been completed for all bands to be rewritten.

When it has been determined in step S902 that the input data comprises periodically refreshing data, in step S909, parameters m and k (m=0, 1, 2, . . . , and k=1, 2, 3, . . . ) are initialized such that m and k are set to 0 and 1, respectively, as in the above-described second embodiment, and as in the processing of the second embodiment shown in FIG. 22, the processing of steps S910–S913 is executed.

Processing after step S914 is the same as in the second embodiment. Hence, a description thereof will be omitted.

As described above, also in the modification of the second embodiment having the above-described configuration, it is possible to prevent discontinuous regions which will appear when data subjected to ED processing for respective bands are displayed on the display device.

As described above, according to the second embodiment of the present invention, by performing non-interlaced scanning with a predetermined sequence for respective bands of image data divided into a plurality of bands, it is possible to display a moving image or a still image by performing image processing which requires connection of lines in upper and lower directions, even when high-degree interlaced scanning is required because of low-frequency driving.

The individual components shown in outline or designated by blocks in the drawings are all well known in the display control method and apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display control apparatus to which image data is input, said display control apparatus comprising:

data storage means for storing the input image data;

division means for dividing the image data stored in said data storage means into a plurality of divided bands each having a predetermined plural number of lines;

scanning means for performing non-interlaced scanning of the image data within each of the divided bands, and for performing interlaced scanning of the image data in units of a band;

image processing means for performing image processing of the image data, scanned by said scanning means, in units of a divided band; and transfer means for transferring data processed by said image processing means to a display device.

2. A display control apparatus according to claim 1, further comprising detection means for detecting an updating position of the input image data, wherein said image processing means performs image processing preferentially for a divided band corresponding to the detected updating position.

3. A display control apparatus according to claim 1, wherein said image processing means converts the input image data into binary data by an error diffusion method.

4. A display control apparatus according to claim 3, wherein said image processing means further comprises:
  first storage means for storing error data for the next line to be processed, wherein the error data is produced when image data of each pixel of one line within a divided band has been processed; and
  second storage means for storing error data for the next line to be processed, wherein the error data is produced when image data of each pixel of the final line of the divided band has been processed.

5. A display control apparatus according to claim 4, wherein the error data stored in said first storage means is updated every time the image processing is transferred to the next line, wherein when error data from processing of the final line in each divided band has been stored in said first storage means, the error data is transferred to said second storage means, and wherein when processing the first line of the image data of each divided band, necessary error data is transferred from said second storage means to said first storage means.

6. A display control apparatus according to claim 3, wherein when performing image processing by the error diffusion method for each divided band, said image processing means starts the image processing from a line predetermined lines above the first line of the divided band, and outputs data after the image processing of the image data of the first line of the divided band.

7. A display control apparatus to which image data is input, said display control apparatus comprising:
  data storage means for storing the input image data;
  division means for dividing the image data stored in said data storage means into a plurality of divided bands each having a predetermined plural number of lines;
  scanning means for performing interlaced scanning of the image data in units of a band;
  image processing means for performing image processing of the image data, scanned by said scanning means, in units of a divided band by an error diffusion method; and
  transfer means for transferring data processed by said image processing means to a display device,
  wherein when processing the image data of the first line of a divided band, said image processing means processes the image data using error data produced from processing of the divided band disposed immediately before the first line of the band being processed.

8. A display control apparatus according to claim 7, wherein said scanning means further performs non-interlaced scanning of the image data within each of the divided bands.

9. A display control apparatus according to claim 7, further comprising detection means for detecting an updating position of the input image data, wherein said image processing means performs image processing preferentially for a divided band corresponding to the detected updating position.

10. A display control apparatus according to claim 7, wherein said image processing means further comprises:
  first storage means for storing error data for the next line to be processed, wherein the error data is produced when image data of each pixel of one line within a divided band is processed; and
  second storage means for storing error data for the next line to be processed, wherein the error data is produced when image data of each pixel of the final line of the divided band is processed.

11. A display control apparatus according to claim 10, wherein the error data stored in said first storage means is updated every time the image processing is transferred to the next line, wherein when error data from processing of the final line in each divided band has been stored in said first storage means, the error data is transferred to said second storage means, and wherein when processing the first line of the image data of each divided band, necessary error data is transferred from said second storage means to said first storage means.

12. A display control apparatus to which image data is input, said display control apparatus comprising:
  data storage means for storing the input image data;
  division means for dividing the image data stored in said data storage means into a plurality of divided bands each having a predetermined number of lines;
  image processing means for performing image processing of the image data in units of a divided band by an error diffusion method; and
  transfer means for transferring data processed by said image processing means to a display device,
  wherein when performing the image processing by the error diffusion method for each divided band, said image processing means starts the image processing, without outputting of processed data, from a line predetermined lines above the first line of the divided band, and outputs processed data after the image processing of the first line of the image data of the divided band.

13. A display control apparatus according to claim 12, further comprising scanning means for performing non-interlaced scanning of the image data within each of the divided bands, and for performing interlaced scanning of the image data in units of a band.

14. A display control apparatus according to claim 12, further comprising detection means for detecting an updating position of the input image data, wherein said image processing means performs image processing preferentially for a divided band corresponding to the detected updating position.

15. An image processing apparatus for performing halftone processing of image data including error diffusion processing while sequentially reading each line constituting the image data, said image processing apparatus comprising:
  means for specifying a line below the first line of the image data;
  means for starting the error diffusion processing of the image data in a direction from the specified line toward the first line, and for performing the error diffusion processing of the image data for lines after the second line by reversing the direction of the processing when the processing has reached the first line; and output means for outputting a result of the error diffusion processing from the first line after the direction of the processing has been reversed without outputting a result of the error diffusion processing before the direction of the processing has been reversed.

16. An image processing apparatus for performing halftone processing of image data including error diffusion processing while sequentially reading each line constituting the image data, said image processing apparatus comprising:

processing means for performing error diffusion processing of image data of the first line a plurality of times; and output means for outputting a final result of the processing of the first line of image data by said processing means without outputting results prior to the final result of the processing of the first line of image data by said processing means.

17. An image apparatus according to claim 16, wherein said processing means performs error diffusion processing once for image data beginning after the second line.

18. A display control method comprising the steps of:

inputting image data;

dividing the input image data into a plurality of divided bands each having a predetermined plural number of lines;

performing non-interlaced scanning of the image data within each of the divided bands, and performing interlaced scanning of the image data in units of a band;

performing image processing of the image data in units of a divided band; and transferring data processed in said image processing step to a display device.

19. A display control method according to claim 18, further comprising a step for detecting an updating position of the input image data, wherein said image processing step performs image processing preferentially for a divided band corresponding to the detected updating position.

20. A display control method according to claim 18, wherein said image processing step converts the input image data into binary data by an error diffusion method.

21. A display control method according to claim 20, wherein said image processing step further comprises the steps of:

storing error data for the next line to be processed produced when image data of each pixel of one line within a divided band has been processed; and storing error data for the next line to be processed produced when image data of each pixel of the final line of the divided band has been processed.

22. A display control method comprising the steps of:

inputting image data;

dividing the input image data into a plurality of divided bands each having a predetermined plural number of lines;

performing interlaced scanning of the image data in units of a band;

performing image processing of the image data, scanned in said step of performing interlaced scanning, in units of a divided band by an error diffusion method; and transferring data processed in said image processing step to a display device, wherein when processing the first line of the image data of a divided band, said image processing step processes image data using error data produced in processing of the divided band disposed immediately before the first line of the band being processed.

23. A display control method comprising the steps of:

inputting image data;

dividing the input image data into a plurality of divided bands each having a predetermined number of lines;

performing image processing of the image data in units of a divided band by an error diffusion method; and transferring data processed in said image processing step to a display device, wherein when performing the image processing by the error diffusion method for each divided band, said image processing step performs the image processing, without outputting of processed data, from a line predetermined lines above the first line of the divided band, and outputs processed data after the image processing of the first line of the image data of the divided band.

* * * * *

UNITED STATES PATENT AND TRADEMARK OFFICE
CERTIFICATE OF CORRECTION

PATENT NO. : 5,701,135

DATED : December 23, 1997

INVENTOR(S): SHUNTARO ARATANI ET AL.

It is certified that error appears in the above-identified patent and that said Letters Patent is hereby corrected as shown below:

<u>ON TITLE PAGE AT ITEM [56] REFERENCES CITED, OTHER PUBLICATIONS</u>

Insert: --IBM Technical Disclosure Bulletin, "Halftoning Method For Mosaic Color Displays Using Error Diffusion", Vol. 32, pp. 194-197 (October 1989).--.

<u>COLUMN 1</u>

Line 39, "FLC'a" should read --FLC's--;
Line 66, "FIG. 18" should read --FIG. 16--.

<u>COLUMN 2</u>

Figures 16, 17:
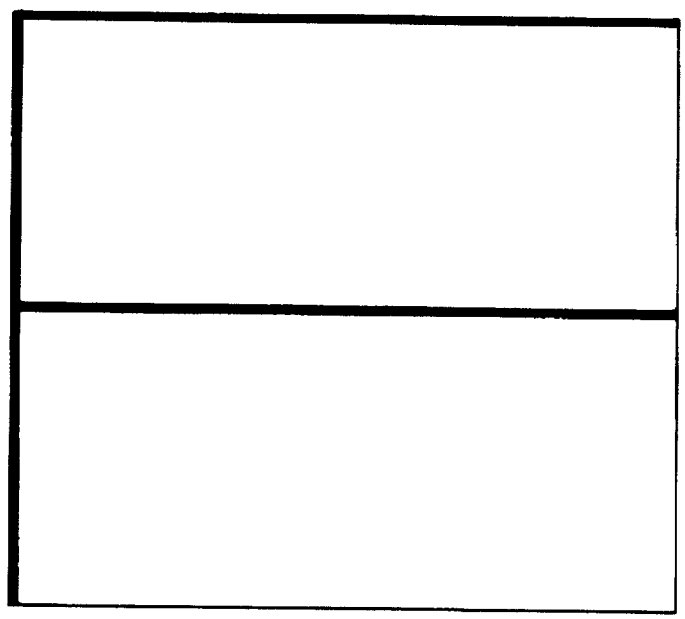

Line 8, "FIG. 18," should read --FIG. 16,--;
Line 11, "FIG. 18)" should read --FIG. 16)--;
Line 66, "in" should be deleted.

<u>COLUMN 3</u>

Line 2, "in" should read --between bands,--.

<u>COLUMN 5</u>

Line 14, "FLCD" should read --FLC--;
Line 36, "$2" should read --32--;
Line 37, "$3" should read --33--.

UNITED STATES PATENT AND TRADEMARK OFFICE
CERTIFICATE OF CORRECTION

PATENT NO. : 5,701,135

DATED      : December 23, 1997

INVENTOR(S): SHUNTARO ARATANI ET AL.

It is certified that error appears in the above-identified patent and that said Letters Patent is hereby corrected as shown below:

<u>COLUMN 11</u>

Line 28, "S612" should read --S512--.

<u>COLUMN 15</u>

Line 18, "image" should read --image processing--.

Signed and Sealed this

Seventeenth Day of November, 1998

Attest:

BRUCE LEHMAN

Attesting Officer          Commissioner of Patents and Trademarks